US009955152B2

(12) United States Patent
Matsunobu et al.

(10) Patent No.: US 9,955,152 B2
(45) Date of Patent: Apr. 24, 2018

(54) IMAGE CODING METHOD AND IMAGE DECODING METHOD

(71) Applicant: Panasonic Corporation, Osaka (JP)

(72) Inventors: Toru Matsunobu, Osaka (JP); Takahiro Nishi, Nara (JP); Youji Shibahara, Osaka (JP); Hisao Sasai, Osaka (JP); Kyoko Tanikawa, Osaka (JP); Toshiyasu Sugio, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 531 days.

(21) Appl. No.: 13/760,316

(22) Filed: Feb. 6, 2013

(65) Prior Publication Data

US 2013/0223517 A1 Aug. 29, 2013

Related U.S. Application Data

(60) Provisional application No. 61/596,005, filed on Feb. 7, 2012.

(51) Int. Cl.
*H04N 19/117* (2014.01)
*H04N 19/126* (2014.01)
*H04N 19/176* (2014.01)
*H04N 19/82* (2014.01)
*H04N 19/167* (2014.01)

(52) U.S. Cl.
CPC ..... *H04N 19/00096* (2013.01); *H04N 19/117* (2014.11); *H04N 19/167* (2014.11); *H04N 19/176* (2014.11); *H04N 19/82* (2014.11)

(58) Field of Classification Search
CPC .......... H04N 19/00096; H04N 19/176; H04N 19/167; H04N 19/82; H04N 19/117
See application file for complete search history.

(56) References Cited

U.S. PATENT DOCUMENTS

| | | | | |
|---|---|---|---|---|
| 6,121,977 | A * | 9/2000 | Arai ................. | G06T 15/00 345/619 |
| 2005/0089235 | A1 * | 4/2005 | Sakaguchi .......... | H04N 19/176 382/239 |
| 2009/0060034 | A1 * | 3/2009 | Park ..................... | H04N 19/105 375/240.12 |
| 2009/0310680 | A1 * | 12/2009 | Jeon ..................... | H04N 19/105 375/240.16 |
| 2010/0253953 | A1 * | 10/2010 | Oota .................... | H04N 1/3333 358/1.9 |

(Continued)

OTHER PUBLICATIONS

ISO/IEC 14496-10 (MPEG-4 Part10: Advanced Video Coding), Oct. 1, 2004.

(Continued)

*Primary Examiner* — Dave Czekaj
*Assistant Examiner* — Berteau Joisil
(74) *Attorney, Agent, or Firm* — Wenderoth, Lind & Ponack, L.L.P.

(57) ABSTRACT

An image coding method includes: obtaining a pixel signal of a current region to be processed; calculating offset information of the current region; applying offset to the current region using the offset information; outputting the offset information; outputting an offset signal resulting from the applying of offset; and controlling the applying of offset.

19 Claims, 46 Drawing Sheets

(56) References Cited

U.S. PATENT DOCUMENTS

| | | | |
|---|---|---|---|
| 2011/0292994 A1* | 12/2011 | Lim | H04N 19/182 |
| | | | 375/240.02 |
| 2012/0287988 A1* | 11/2012 | Chong | H04N 19/105 |
| | | | 375/240.02 |
| 2013/0177079 A1* | 7/2013 | Kim | H04N 19/00569 |
| | | | 375/240.12 |
| 2014/0003522 A1* | 1/2014 | Park | H04N 19/105 |
| | | | 375/240.16 |
| 2014/0369420 A1* | 12/2014 | Alshina | H04N 19/96 |
| | | | 375/240.25 |

OTHER PUBLICATIONS

Thomas Wiegand et al., "Overview of the H.264/AVC Video Coding Standard", IEEE Transactions on Circuits and Systems for Video Technology, vol. 13, No. 7, Jul. 2003, pp. 560-576.

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d1, 7th Meeting: Geneva, CH, Nov. 21-30, 2011, http://phenix.it-sudparis.eu/jct/doc_end_user/documents/7_Geneva/wg11/JCTVCG1103-v2.zip.

\* cited by examiner

FIG. 4

| Class | condition | Edge shape |
|---|---|---|
| 1 | $c < c1$ && $c < c2$ | |
| 2 | $(c < c1$ && $c == c2)$ \|\| $(c == c1$ && $c < c2)$ | |
| 3 | $(c > c1$ && $c == c2)$ \|\| $(c == c1$ && $c > c2)$ | |
| 4 | $c > c1$ && $c > c2$ | |
| 0 | None of the above | |

FIG. 7

| Class | Condition | Class | Condition |
|---|---|---|---|
| 1 | $R0 \leq c < R1$ | 9 | $R8 \leq c < R9$ |
| 2 | $R1 \leq c < R2$ | 10 | $R9 \leq c < R10$ |
| 3 | $R2 \leq c < R3$ | 11 | $R10 \leq c < R11$ |
| 4 | $R3 \leq c < R4$ | 12 | $R11 \leq c < R12$ |
| 5 | $R4 \leq c < R5$ | 13 | $R12 \leq c < R13$ |
| 6 | $R5 \leq c < R6$ | 14 | $R13 \leq c < R14$ |
| 7 | $R6 \leq c < R7$ | 15 | $R14 \leq c < R15$ |
| 8 | $R7 \leq c < R8$ | 16 | $R15 \leq c < R16$ |

FIG. 20

| | Descriptor |
|---|---|
| slice_data( ) { | |
| CurrTbAddr = first_tb_in_slice | |
| moreDataFlag = 1 | |
| if( adaptive_loop_filter_flag && alf_cu_control_flag ) | |
| AlfCuFlagIdx = -1 | |
| do { | |
| xCU = HorLumaLocation( CurrTbaddr ) | |
| yCU = VerLumaLocation( CurrTbaddr ) | |
| NumLine | u(v) |
| WeightedOffset[NumLine] | u(v) |
| coding_tree( xCU, yCU, Log2TbSize ) | |
| if( !entropy_coding_mode_flag ) | |
| moreDataFlag = more_rbsp_data( ) | |
| else { | |
| end_of_slice_flag | ae(v) |
| moreDataFlag = !end_of_slice_flag | |
| } | |
| CurrTbAddr = NextTbAddress( CurrTbAddr ) | |
| } While( moreDataFlag ) | |
| } | |

Number of lines for which offset values are decreased

Weighting factors for decrease of offset values

FIG. 34

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

FIG. 37
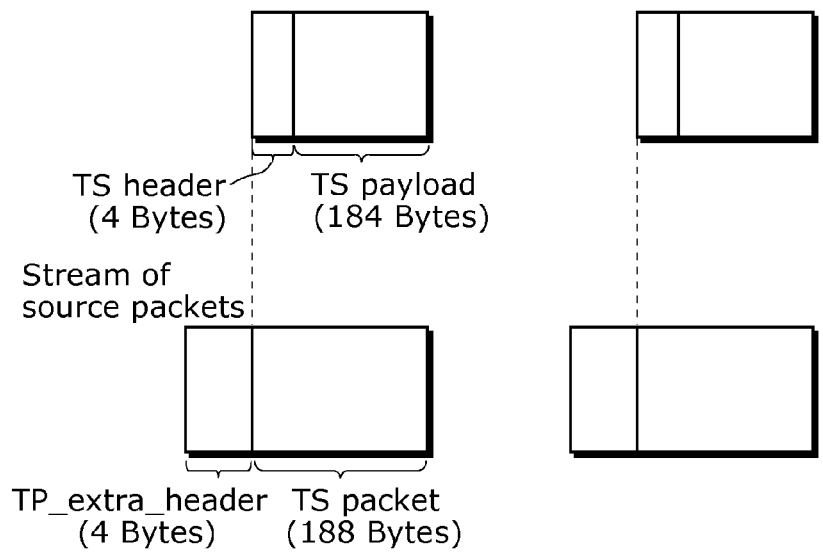
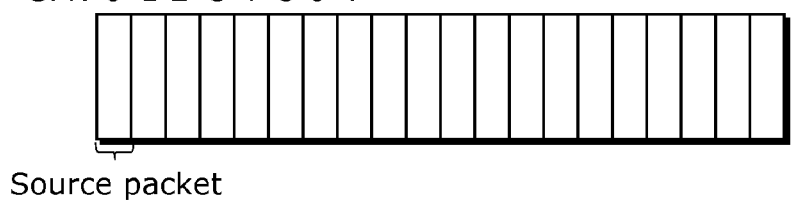

FIG. 45

| Corresponding standard | Driving frequency |
|---|---|
| MPEG-4 AVC | 500 MHz |
| MPEG-2 | 350 MHz |
| ⋮ | ⋮ |

IMAGE CODING METHOD AND IMAGE DECODING METHOD

CROSS REFERENCE TO RELATED APPLICATION

The present application claims the benefit of U.S. Provisional Patent Application No. 61/596,005 filed on Feb. 7, 2012. The entire disclosure of the above-identified application, including the specification, drawings and claims is incorporated herein by reference in its entirety.

FIELD

The present invention relates to image coding methods, image decoding methods, image coding apparatuses, and image decoding apparatuses, and particularly to an image coding method, an image decoding method, an image coding apparatus, and an image decoding apparatus each of which involves quantization or inverse quantization using a quantization matrix.

BACKGROUND

There has been a plurality of video coding standards developed for compression of video data. Such video coding standards include, for example, the ITU-T standards denoted as H.26x, produced by the telecommunication standardization sector of the international telecommunication union, and the ISO/IEC standards denoted as MPEG-x. The present newest and advanced video coding standard is the standard denoted as H.264/AVC or MPEG-4 AVC (see Non Patent Literature 1 and Non Patent Literature 2).

Furthermore, for the standard of High Efficiency Video Coding (HEVC) that is a next-generation video coding standard, various analyses have been being conducted to increase coding efficiency (see Non Patent Literature 3).

CITATION LIST

Non Patent Literature

[NPL 1] ISO/IEC 14496-10 "MPEG-4 Part 10 Advanced Video Coding"

[NPL 2] Thomas Wiegand et al., "Overview of the H.264/AVC Video Coding Standard", IEEE TRANSACTIONS ON CIRCUITS AND SYSTEMS FOR VIDEO TECHNOLOGY, JULY 2003, PP. 560-576

[NPL 3] Joint Collaborative Team on Video Coding (JCT-VC) of ITU-T SG16 WP3 and ISO/IEC JTC1/SC29/WG11 7th Meeting: Geneva, CH, 21-30 Nov. 2011, JCTVC-G1103 Title: High Efficiency Video Coding (HEVC) text specification Working Draft 5, http://phenix.it-sudparis.eu/jct/doc_end_user/documents/7_Geneva/wg11/J CTVC-G1103-v2.zip

SUMMARY

However, in the above conventional technique, different pixel classification methods are used for calculating offset values for neighboring regions. As a result, different offset values are added to such neighboring regions which are located on each side of a boundary and have identical or very close pixel values. This causes a problem that a resulting subjective image has block noise.

Conceived to address this problem, the present invention has an object of providing an image coding method and an image decoding method each of which increase subjective image quality.

In order to solve the above problem, an image coding method according to an aspect of the present invention is provided which is a image coding method of coding an image and includes: obtaining a pixel signal of a current region to be processed; calculating offset information of the current region; applying offset to the current region using the offset information; outputting the offset information; outputting an offset signal resulting from the applying of offset; and controlling the applying of offset.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

The present invention can increase subjective image quality.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 schematically shows an example of edge offset in the image coding apparatus according to prior art to the present invention.

FIG. 7 schematically shows an example of band offset in the image coding apparatus according to prior art to the present invention.

FIG. 20 schematically shows an example of slice syntax according to Embodiment 1 of the present invention.

FIG. 34 illustrates a structure of multiplexed data.

FIG. 37 shows a structure of TS packets and source packets in the multiplexed data.

FIG. 45 shows an example of a look-up table in which video data standards are associated with driving frequencies.

DETAILED DESCRIPTION

Underlying Knowledge Forming Basis of the Present Disclosure

The Inventors have found the following problem with the image coding method and image decoding method described in the section of "Background."

In recent years, there have been an increasing number of applications which involve video conferences, digital video broadcasting, or video streaming via the Internet (for example, applications for video-on-demand services). These applications are dependent on transmission of video information. In transmission or recoding of video data, a large amount of data is transmitted through a conventional transmission path of a limited bandwidth or is recorded onto a conventional recording medium with limited data capacity. In order to transmit video data through a conventional transmission path and to record video data onto a conventional recording medium, it is essential to compress or reduce the amount of digital data.

In view of this, a plurality of video coding standards for video data compression has been being developed. Such video coding standards include, for example, the ITU-T standards denoted as H.26x, produced by the telecommunication standardization sector of the international telecommunication union, and the ISO/IEC standards denoted as MPEG-x. The present newest and advanced video coding standard is the standard denoted as H.264/AVC or MPEG-4 AVC (see Non Patent Literature 1 and Non Patent Literature 2).

Furthermore, for the standard of High Efficiency Video Coding (HEVC) that is a next-generation video coding standard, various analyses have been being conducted to increase coding efficiency (see Non Patent Literature 3).

Figure 1:
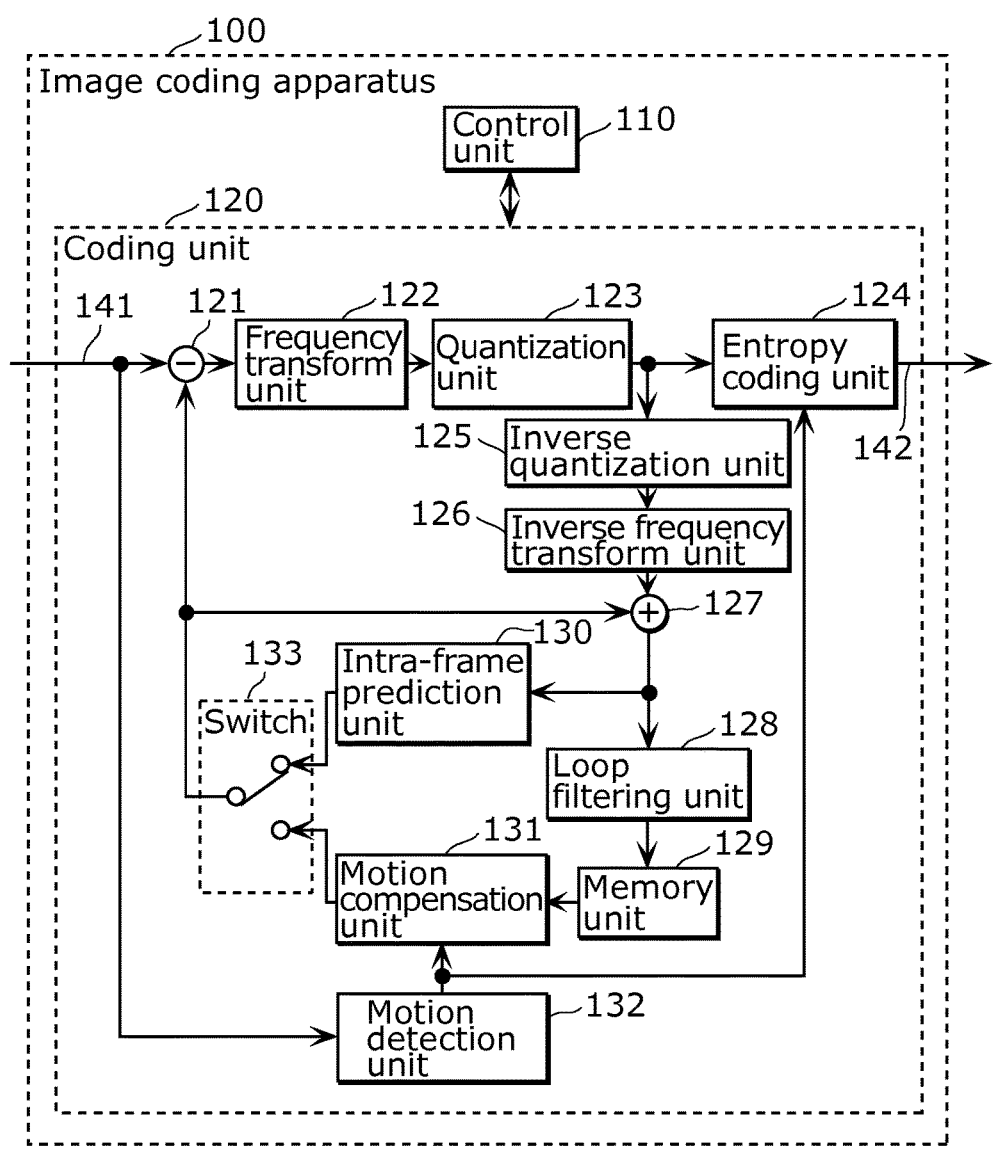
FIG. 1 is a block diagram showing an exemplary configuration of an image coding apparatus according to prior art to the present invention.

FIG. 1 shows a structure of a conventional image coding apparatus according to a standard of HEVC. An image coding apparatus 100 shown in FIG. 1 includes a control unit 110 and a coding unit 120. The coding unit 120 includes a subtractor 121, a frequency transform unit 122, a quantization unit 123, an entropy coding unit 124, an inverse quantization unit 125, an inverse frequency transform unit 126, an adder unit 127, a loop filtering unit 128, a memory unit 129, an intra-frame prediction unit 130, a motion compensation unit 131, a motion estimation unit 132, and a switch 133.

As shown in FIG. 1, the coding unit 120 codes an image 141 on a per-block basis to generate a coded stream 142. In doing so, the subtractor unit 121 of the coding unit 120 subtracts a pixel block composed of a plurality of pixel values in a prediction image from a pixel block composed of a plurality of pixel values of the image 141. The frequency transform unit 122 transforms a pixel block resulting from the subtraction into a coefficient block composed of a plurality of frequency coefficients. The quantization unit 123 quantizes the coefficient block obtained by the frequency transform unit 122.

Meanwhile, the motion estimation unit 132 estimates a motion vector using the pixel block of the image 141. The motion compensation unit 131 performs inter-frame prediction (inter prediction) using a reference image stored in the memory unit 129 and a motion vector estimated by the motion estimation unit 132. The intra-frame prediction unit 130 performs, according to an intra-frame prediction mode, intra-frame prediction (intra prediction) using a pixel block obtained by the adder unit 127. The switch 133 inputs, to the subtractor unit 121 and the adder unit 127, the pixel block of the prediction image resulting from the intra-frame prediction or the inter-frame prediction.

The entropy coding unit 124 performs entropy coding on block partition information, a type of prediction, a motion vector, a prediction mode (an intra-frame prediction mode), a quantization parameter, a quantized coefficient block, and so on to generate a coded stream 142.

The inverse quantization unit 125 inversely quantizes a quantized coefficient block. Subsequently, the inverse frequency transform unit 126 transforms the inversely quantized coefficient block into a pixel block. The adder unit 127 then adds the pixel block of the prediction image to the pixel block obtained by the inverse frequency transform unit 126. The loop filtering unit 128 reduces artifacts in the pixel block obtained by the adder unit 127 and stores the pixel block as a reference image in the memory unit 129.

Furthermore, the control unit 110 controls the coding unit 120.

The image coding apparatus 100 codes the image 141 by the above-described operation. In addition, the image coding apparatus 100 allows for reduction in the data amount of the coded stream 142 through various processes such as frequency transform, quantization, intra-frame prediction, inter-frame prediction, entropy coding, and loop filtering.

Figure 2:
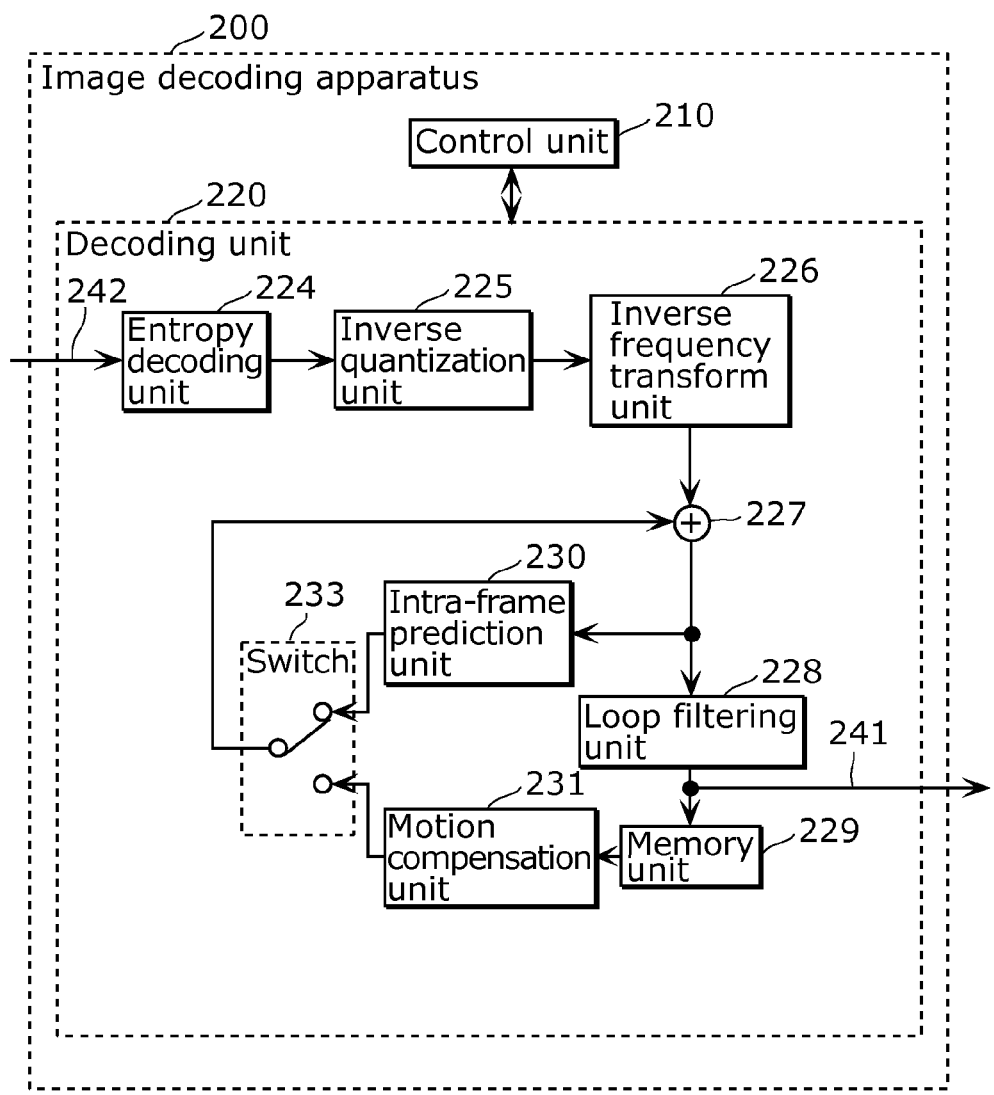
FIG. 2 is a block diagram showing an exemplary configuration of an image decoding apparatus according to prior art to the present invention.

FIG. 2 shows a configuration of an image decoding apparatus corresponding to the image coding apparatus 100 shown in FIG. 1. An image decoding apparatus 200 shown in FIG. 2 includes a control unit 210 and a decoding unit 220. The decoding unit 220 includes an entropy decoding unit 224, an inverse quantization unit 225, an inverse frequency transform unit 226, an adder unit 227, a loop filtering unit 228, a memory unit 229, an intra-frame prediction unit 230, a motion compensation unit 231, and a switch 233.

As shown in FIG. 2, the decoding unit 220 decodes, on a per-block basis, an image 241 included in a coded stream 242. In doing so, the entropy decoding unit 224 of the decoding unit 220 performs entropy decoding on the coded stream 242 to obtain block partition information, a type of prediction, a motion vector, an intra-frame prediction mode, a quantization parameter, a quantized coefficient block, and so on.

Furthermore, the control unit 210 controls operation of the decoding unit 220.

The inverse quantization unit 225 of the decoding unit 220 inversely quantizes a quantized coefficient block. The inverse frequency transform unit 226 transforms the inversely quantized coefficient block into a pixel block.

The adder unit 227 then adds the pixel block of the prediction image to the pixel block obtained by the inverse frequency transform unit 226. The loop filtering unit 228 reduces artifacts in the pixel block obtained by the adder unit 227. Subsequently, the loop filtering unit 228 stores a reference image composed of pixel blocks in the memory unit 229. Furthermore, the loop filtering unit 228 outputs an image 241 composed of pixel blocks.

When the type of prediction is intra-frame prediction, the intra-frame prediction unit 230 performs, according to an intra-frame prediction mode, the intra-frame prediction using the pixel block obtained by the adder unit 227. When the type of prediction is inter-frame prediction, the motion compensation unit 231 performs inter-frame prediction using the motion vector and the reference image stored in the memory unit 229. The switch 233 inputs, to the adder unit 227, the pixel block of the prediction image resulting from the intra-frame prediction or the inter-frame prediction.

As above, the image decoding apparatus 200 decodes, on a per-block basis, the image 241 included in the coded stream 242, by the operation corresponding to the image coding apparatus 100.

Here, a process of sample adaptive offset (SAO) is described in more detail. SAO is applied as one of loop filters performed in conventional image coding schemes represented by the HEVC standard.

SAO is applied to reduce artifacts with respect to an input image signal by adding offset values to pixels included in a coded block currently to be processed.

In application of SAO, pixels in a block are classified into categories. The same offset value is used for the application of SAO to the pixels belonging to a category. There are two methods of pixel classification: edge offset and band offset. In the edge offset, pixels are classified based on comparison of a pixel to be classified with its neighboring pixels. In the band offset, pixels are classified based on the value of a pixel to be classified.

Figure 3:
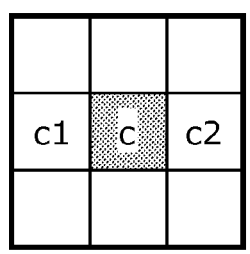
FIG. 3 schematically shows an example of edge offset in the image coding apparatus according to prior art to the present invention.

FIG. 3 schematically shows an example of pixel classification using the edge offset. In the edge offset, a pixel c is classified based on the magnitude relationship in value between the pixel c and its neighboring pixels c1 and c2 on both sides of the pixel c.

FIG. 4 schematically shows an example in which a block is classified into five categories using the edge offset. For example, in the case where the value of the pixel c is greater than the value of the pixel c1 and equal to the value of the pixel c2, the pixel c is classified into Category 3, and then an offset value of Offset [3] assigned to Category 3 is added to the value of the pixel c.

Figure 5:
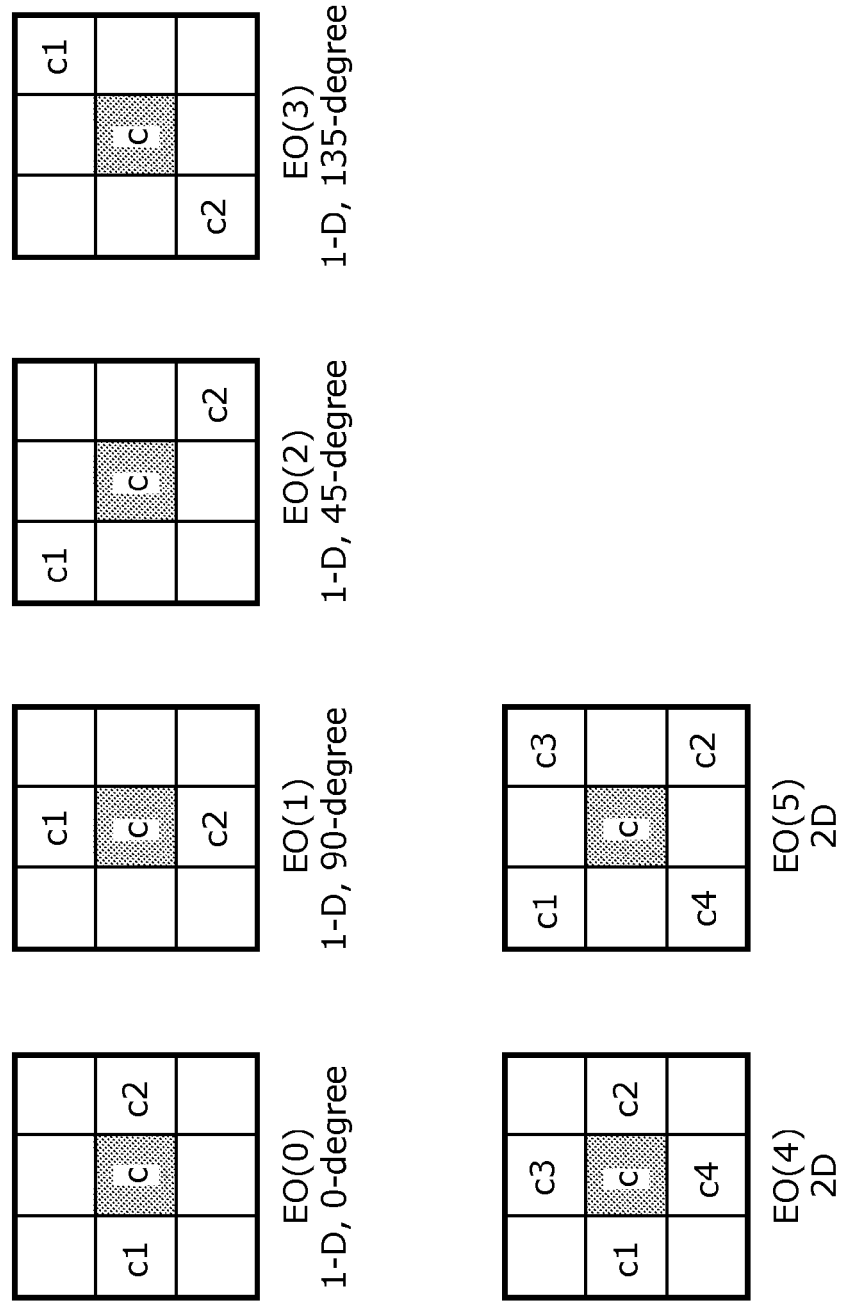
FIG. 5 schematically shows an example of edge offset in the image coding apparatus according to prior art to the present invention.

As shown in FIG. 5, in the edge offset, a pixel to be classified is compared with neighboring pixels along a horizontal direction (EO (0)), neighboring pixels along a vertical direction (EO (1)), neighboring pixels along a diagonal direction (EO (2) or EO (3)), combinations thereof (EO (4) or EO (5)), or the like.

Figure 6:
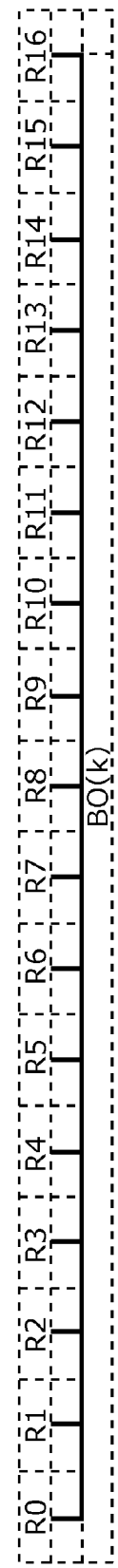
FIG. 6 schematically shows an example of band offset in the image coding apparatus according to prior art to the present invention.

FIG. 6 schematically shows an example of pixel classification using the band offset. As shown in FIG. 6, the full range of gradient values of pixels to be classified is uniformly split into M segments. For an example, M is 32. Each of the segments is a category. A pixel is classified as a category to which the gradient value of the pixel belongs.

Figure 8:
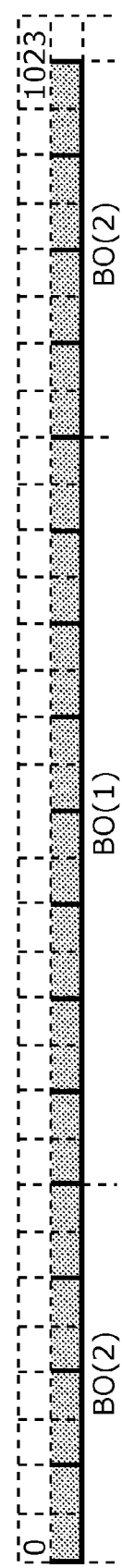
FIG. 8 schematically shows an example of band offset in the image coding apparatus according to prior art to the present invention.

FIG. 7 schematically shows an example in which blocks are classified into 16 classes using the band offset. For example, in the case where the value of the pixel c is not less than R9 and is smaller than R10, the pixel c is classified as Category 9, and then an offset value of Offset [9], which is predetermined for Category 9, is added to the pixel c. Furthermore, in the band offset, gradient values of pixels are classified into a limited number of categories. For example, when the SAO is applied at a precision of 10 bits as shown in FIG. 8, the range of gradient values of 0 to 1023 is split into 32 categories. This means that each category has eight gradient values. In one classification method (BO (0)), only middle 16 categories in the range are used. In another classification method (BO (1)), only 8 categories at each ends of the range, that is, the 16 categories other than the middle 16 categories are used.

Figure 9A:
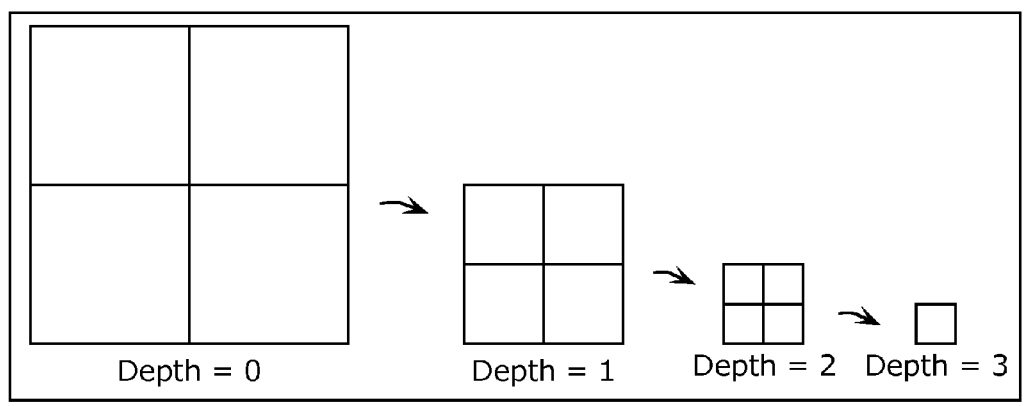
FIG. 9A schematically shows an example of partitioning into subregions in SAO (sample adaptive offset) in the image coding apparatus according to prior art to the present invention.
Figure 9B:
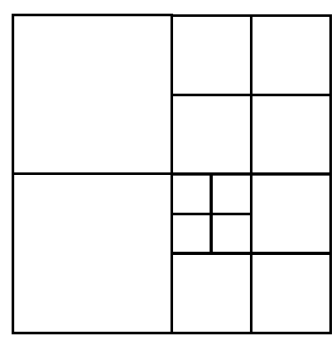
FIG. 9B schematically shows an example of division of partitioning into subregions in SAO (sample adaptive offset) in the image coding apparatus according to prior art to the present invention.

Moreover, in the process of SAO, an appropriate pixel classification method and an appropriate offset value are determined for each unit region to be processed which is a block resulting from partitioning of a picture performed using a tree structure as shown in FIG. 9A. FIG. 9B shows an example of a pattern of partitioning.

Figure 10:
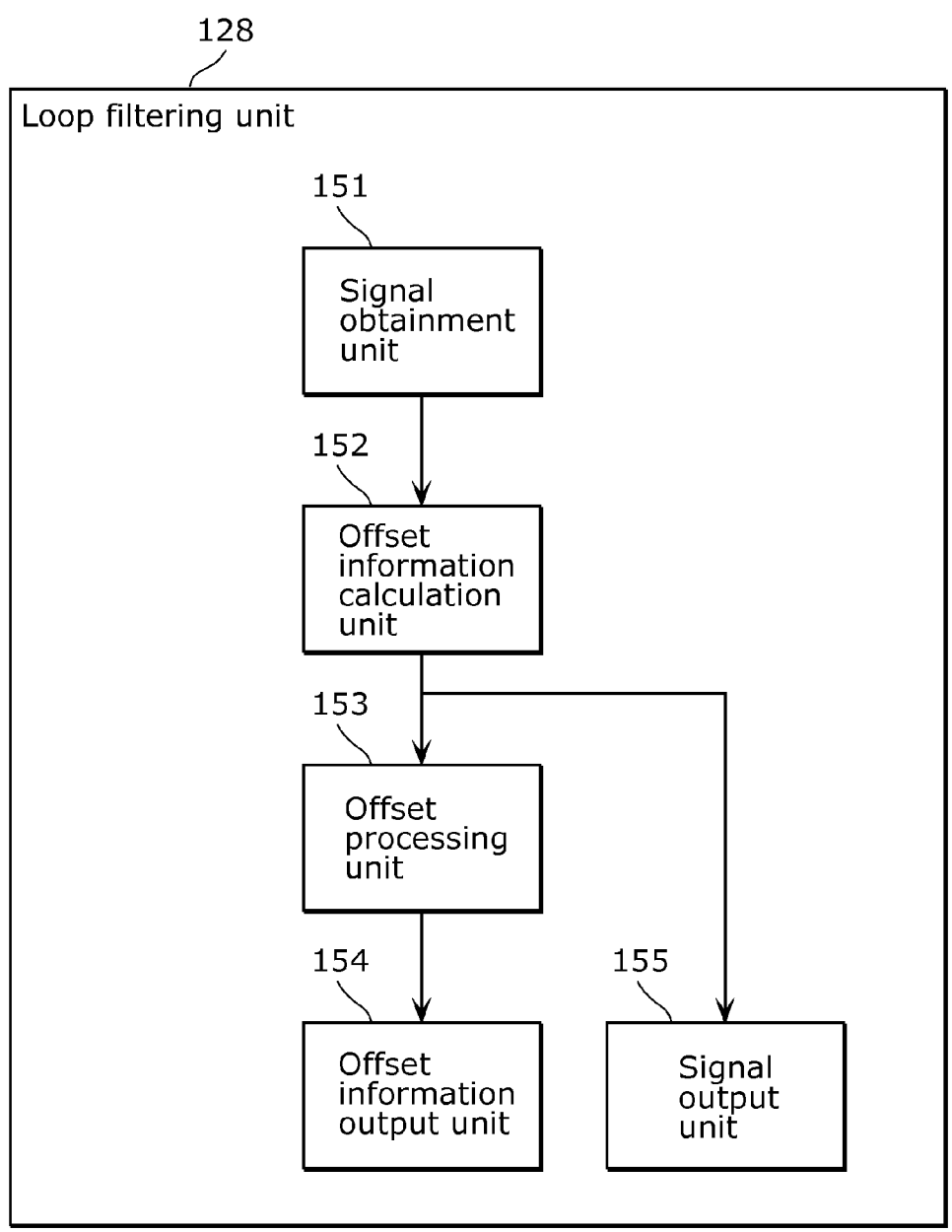
FIG. 10 is a block diagram showing an exemplary configuration of a loop filtering unit in the image coding apparatus according to prior art to the present invention.

FIG. 10 is a block diagram showing an example of a configuration of the loop filtering unit 128 in the conventional image coding apparatus according to a standard of HEVC.

The loop filtering unit 128 includes a signal obtainment unit 151, an offset information calculation unit 152, an offset processing unit 153, an offset information output unit 154, and a signal output unit 155.

The signal obtainment unit 151 obtains a pixel signal of a coded current region.

The offset information calculation unit 152 calculates a pattern of partitioning, a pixel classification method, an offset value, and others which are to be used in offset processing.

The offset processing unit 153 classifies pixels in a current region into categories using offset information and applies offset on a per-category basis.

The offset information output unit 154 outputs offset information to the entropy coding unit 124 shown in FIG. 1.

The signal output unit 155 outputs a current region to which offset has been applied.

Figure 11:
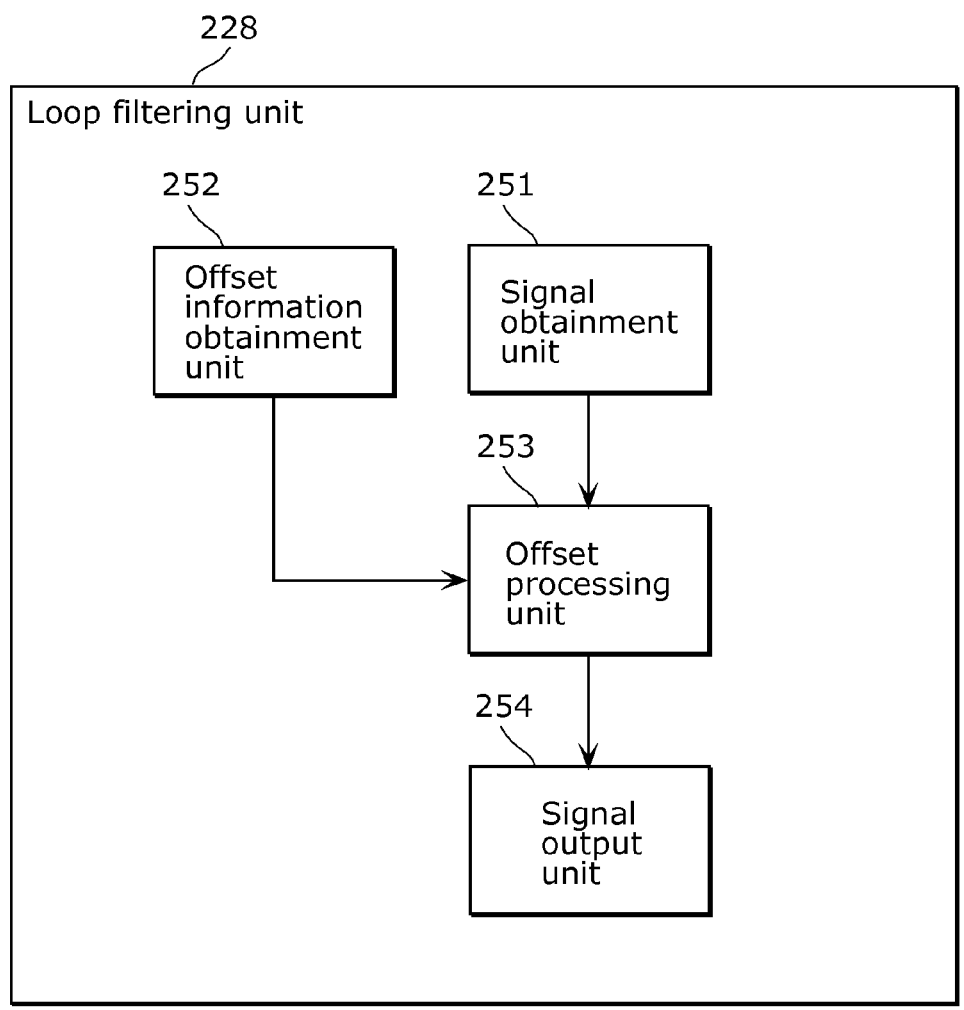
FIG. 11 is a block diagram showing an exemplary configuration of the loop filtering unit in the image decoding apparatus according to prior art to the present invention.

FIG. 11 is a block diagram showing an example of a configuration of the loop filtering unit 228 in the conventional image decoding apparatus which corresponds to the conventional image coding apparatus according to a standard of HEVC shown in FIG. 10.

The loop filtering unit 228 includes a signal obtainment unit 251, an offset information calculation unit 252, an offset processing unit 253, and a signal output unit 254.

The signal obtainment unit 251 obtains a pixel signal of a coded current region.

The offset information calculation unit 252 obtains a pattern of partitioning, a pixel classification method, an offset value, and others which are to be used in offset processing.

The offset processing unit 253 classifies pixels in a current region into categories using offset information and applies offset on a per-category basis.

The signal output unit 254 outputs a current region to which offset has been applied.

Figure 12:
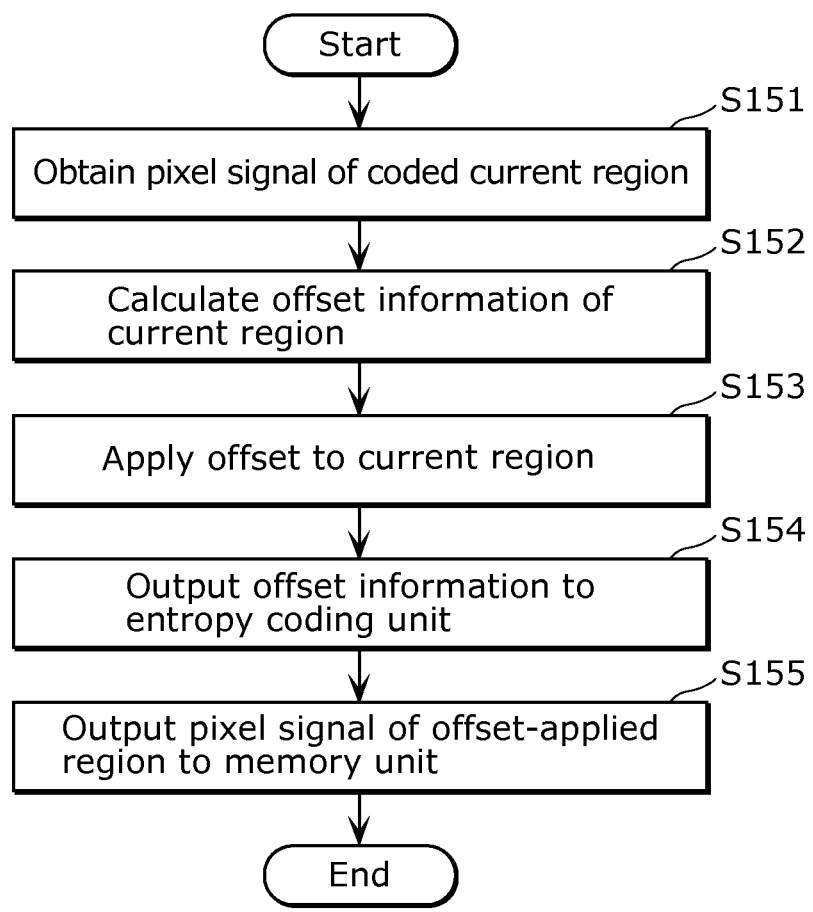
FIG. 12 is a flowchart showing an exemplary operation of the loop filtering unit in the image coding apparatus according to prior art to the present invention.

FIG. 12 is a flowchart showing an operation of the loop filtering unit 128 in the image coding apparatus 100 shown in FIG. 1.

First, the signal obtainment unit 151 obtains a pixel signal of a coded current region from the adder unit 127 (S151).

Next, the offset information calculation unit 152 calculates a pattern of partitioning, a pixel classification method, an offset value, and others which are to be used in offset processing (S152).

Next, the offset processing unit 153 partitions the current region into subregions based on the offset information, classifies pixels in the subregions into categories, and adds an offset value to each of the pixels on a per-category basis (S153).

Next, the offset information output unit 154 outputs the pattern of partitioning, pixel classification method, and offset value to the entropy coding unit 124 (S154).

Then, the signal output unit 155 outputs the pixel signal of the current region to which offset has been applied to the memory unit 129 (S155).

Figure 13:
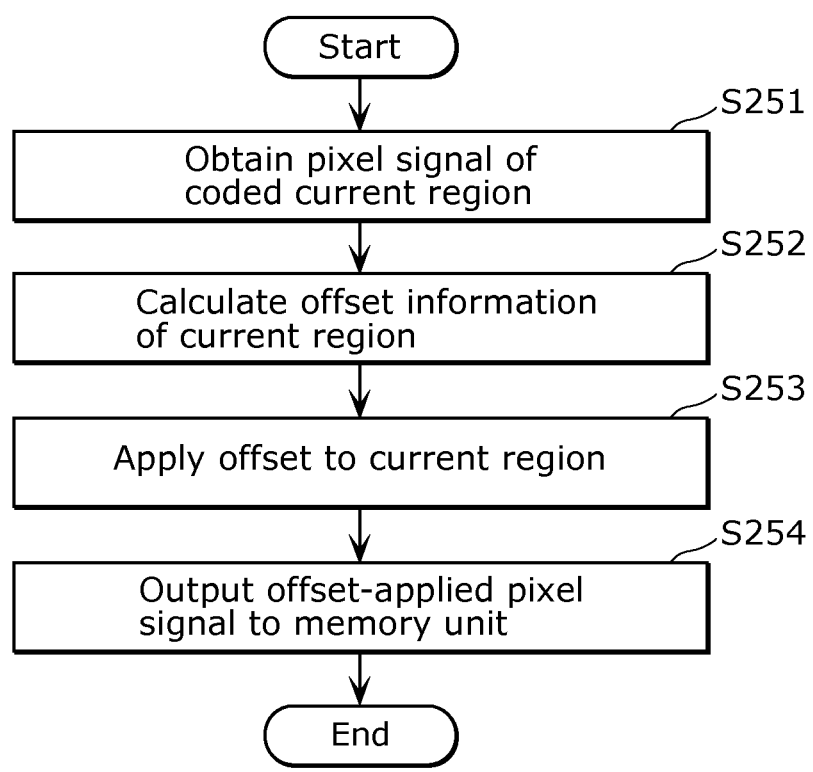
FIG. 13 is a flowchart showing an exemplary operation of the loop filtering unit in the image decoding apparatus according to prior art to the present invention.

FIG. 13 is a flowchart showing an operation of the loop filtering unit 228 in the image decoding apparatus 200 shown in FIG. 2.

First, the signal obtainment unit 251 obtains a pixel signal of a coded current region from the adder unit 227 (S251).

Next, the offset information calculation unit 252 obtains a pattern of partitioning, a pixel classification method, and an offset value decoded by the entropy decoding unit 224 (S252).

Next, the offset processing unit 253 partitions the current region into subregions based on the offset information, classifies pixels in the subregions, and adds an offset value to each of the pixels on a per-category basis (S253).

Then, the signal output unit 254 outputs a pixel signal of the current region to which offset has been applied to the memory unit 229 (S254).

This makes it possible to generate a decoded image approximate to the input image while suppressing increase in bit quantities.

However, in the above conventional technique, offset values are calculated for neighboring regions using different pixel classification methods. As a result, different offset values are added to the regions which neighbor each other on each side of a boundary and have identical or very close pixel values. This causes a problem that a resulting subjective image has block noise.

Conceived to address this problem, the present invention has an object of providing an image coding method and an image decoding method each of which provides subjective images having increased quality.

In order to solve the above problem, an image coding method according to an aspect of the present invention is provided which is a image coding method of coding an image and includes: obtaining a pixel signal of a current region to be processed; calculating offset information of the current region; applying offset to the current region using the offset information; outputting the offset information; outputting an offset signal resulting from the applying of offset; and controlling the applying of offset.

For example, the offset information includes at least one of (i) a pattern of partitioning of the current region, (ii) a pixel classification method for classifying pixels in the current region into categories, and (iii) an offset value assigned to each of the categories.

For example, in the pixel classification method, at least one of a relationship between a current pixel to be classified and a pixel neighboring the current pixel and a value of the current pixel is used.

For example, in the controlling, the offset to be applied to a current pixel in a neighborhood of a boundary with a region neighboring the current region is decreased when pixel classification methods are different between the current region and the neighboring region.

For example, the offset information includes at least one of a total number of lines for which the offset is decreased and weighting factors.

For example, the weighting factors are such that an offset value is further decreased for a pixel at a shorter distance from the boundary with the neighboring region.

For example, the weighting factors are such that an offset value having a larger absolute value is further decreased.

Furthermore, an image decoding method according to an aspect of the present invention is an image decoding method of decoding an image and includes: obtaining a pixel signal of a current region to be processed; obtaining offset information; applying offset to the current region using the offset information; outputting an offset signal resulting from the applying of offset; and controlling the applying of offset.

For example, the offset information includes an offset parameter and information indicating a location of the offset parameter to be referred to.

For example, the information indicating a location of the offset parameter to be referred to includes information indicating a location where an offset parameter extracted from a coded stream is stored or a location where an offset parameter for a region neighboring the current region is stored.

For example, the region neighboring the current region is located left of or above the current region.

For example, the offset parameter includes at least one of (i) a pattern of partitioning of the current region, (ii) a pixel classification method for classifying pixels into categories, and (iii) an offset value assigned to each of the categories.

For example, in the controlling, the applying of offset is controlled so that it is determined for in the applying of offset whether pixel classification methods are different between the current region and a region neighboring the current region.

For example, in the controlling, the offset to be applied to a pixel in a neighborhood of a boundary with a neighboring region is decreased when it is determined that pixel classification methods are different between the current region and the neighboring region.

For example, in the determining, the location of an offset parameter to be referred to is used.

For example, the offset information includes at least one of a total number of lines for which the offset is decreased and weighting factors.

For example, the weighting factors are such that an offset value is further decreased for a pixel at a shorter distance from the boundary with the neighboring region.

For example, the weighting factors are such that an offset value having a larger absolute value is further decreased.

These general and specific aspects can be implemented as a system, a method, an integrated circuit, a computer program, a computer-readable recording medium such as a CD-ROM, or as any combination of a system, a method, an integrated circuit, a computer program, and a computer-readable recording medium.

Exemplary embodiments will be described below with reference to the drawings.

Each of the embodiments described below shows a general or specific example. The values, materials, constituent elements, layout and connection of the constituent elements, steps, and the order of the steps in the embodiments are given not for limiting the present invention but merely for illustrative purposes only. Therefore, among the structural elements in the following exemplary embodiments, structural elements not recited in any one of the independent claims are described as arbitrary structural elements.

Embodiment 1

Figure 14:
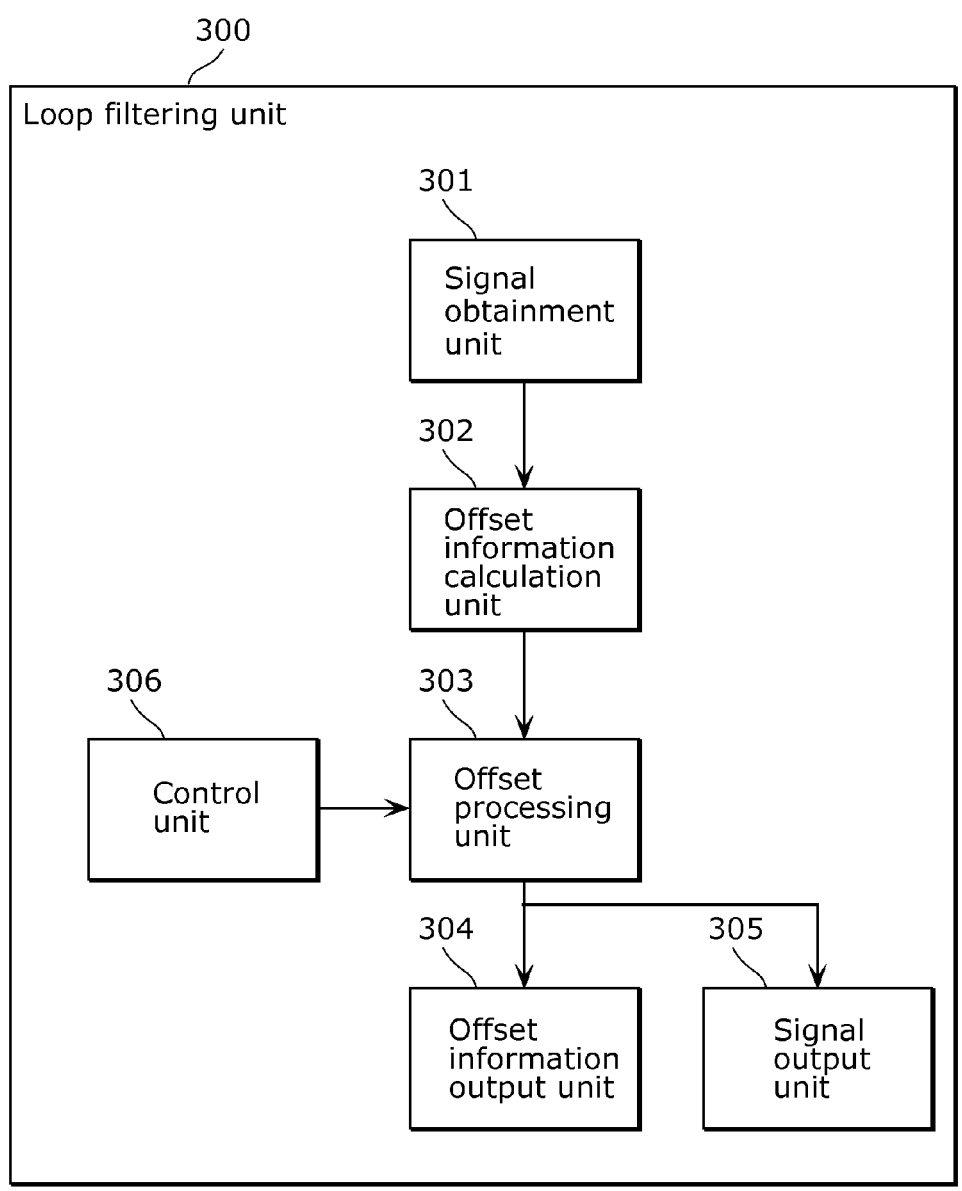
FIG. 14 is a block diagram showing an exemplary configuration of a loop filtering unit in an image coding apparatus according to Embodiment 1 of the present invention.

A configuration of a loop filtering unit 300 in an image coding apparatus according to Embodiment 1 will be described below. FIG. 14 is a block diagram showing an exemplary configuration of the loop filtering unit 300 including constituent elements characteristic to the image coding apparatus according to Embodiment 1. As will be described later, the loop filtering unit 300 according to Embodiment 1 of the present invention corresponds to part of the image coding apparatus 100 which compresses and codes an image signal and outputs coded image data.

The loop filtering unit 300 includes a signal obtainment unit 301, an offset information calculation unit 302, an offset processing unit 303, an offset information output unit 304, a signal output unit 305, and a control unit 306. The control unit 306 may be included in the control unit 110 shown in FIG. 1.

The signal obtainment unit 301 obtains a pixel signal of a coded current region.

The offset information calculation unit 302 calculates a pattern of partitioning, a pixel classification method, an offset value, and others which are to be used in offset processing.

The offset processing unit 303 classifies pixels in a current region into categories using offset information and applies offset on a per-category basis.

The offset information output unit 304 outputs offset information to the entropy coding unit 124 shown in FIG. 1.

The signal output unit 305 outputs a current region to which offset has been applied.

The control unit 306 controls the offset which the offset processing unit 303 performs.

Figure 15:
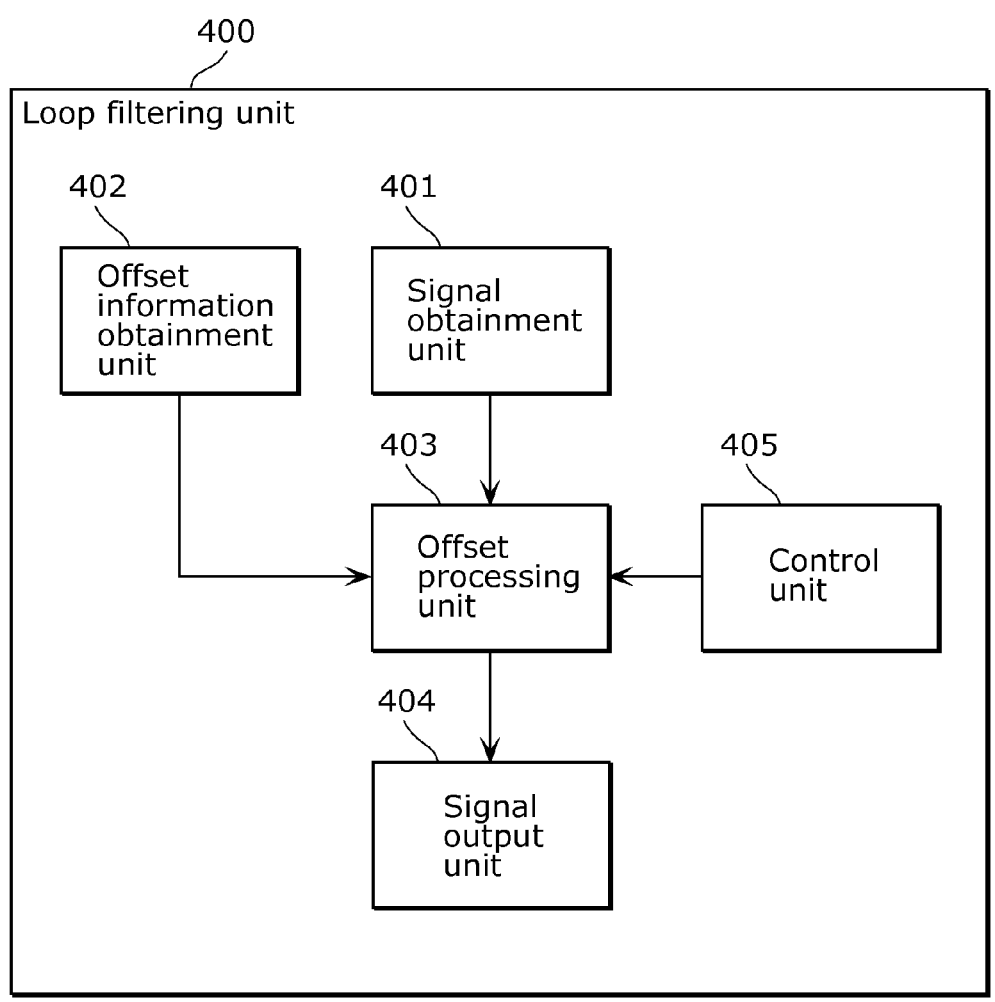
FIG. 15 is a block diagram showing an exemplary configuration of a loop filtering unit in an image decoding apparatus according to Embodiment 1 of the present invention.

FIG. 15 shows an exemplary configuration of a loop filtering unit 400 including constituent elements characteristic to the image decoding apparatus corresponding to the image coding apparatus according to Embodiment 1. As will be described later, the loop filtering unit 400 according to Embodiment 1 of the present invention corresponds to part of the image decoding apparatus 200 which decodes a coded signal and outputs decoded image data.

The loop filtering unit 400 includes a signal obtainment unit 401, an offset information calculation unit 402, an offset processing unit 403, a signal output unit 404, and a control unit 405. The control unit 406 may be included in the control unit 210 shown in FIG. 2.

The signal obtainment unit 401 obtains a pixel signal of a coded current region.

The offset information calculation unit 402 obtains a pattern of partitioning, a pixel classification method, an offset value, and others which are to be used in offset processing.

The offset processing unit 403 classifies pixels in a current region into categories using offset information and applies offset on a per-category basis.

The signal output unit 404 outputs a current region to which offset has been applied.

The control unit 405 controls the offset which the offset processing unit 403 performs.

Figure 16:
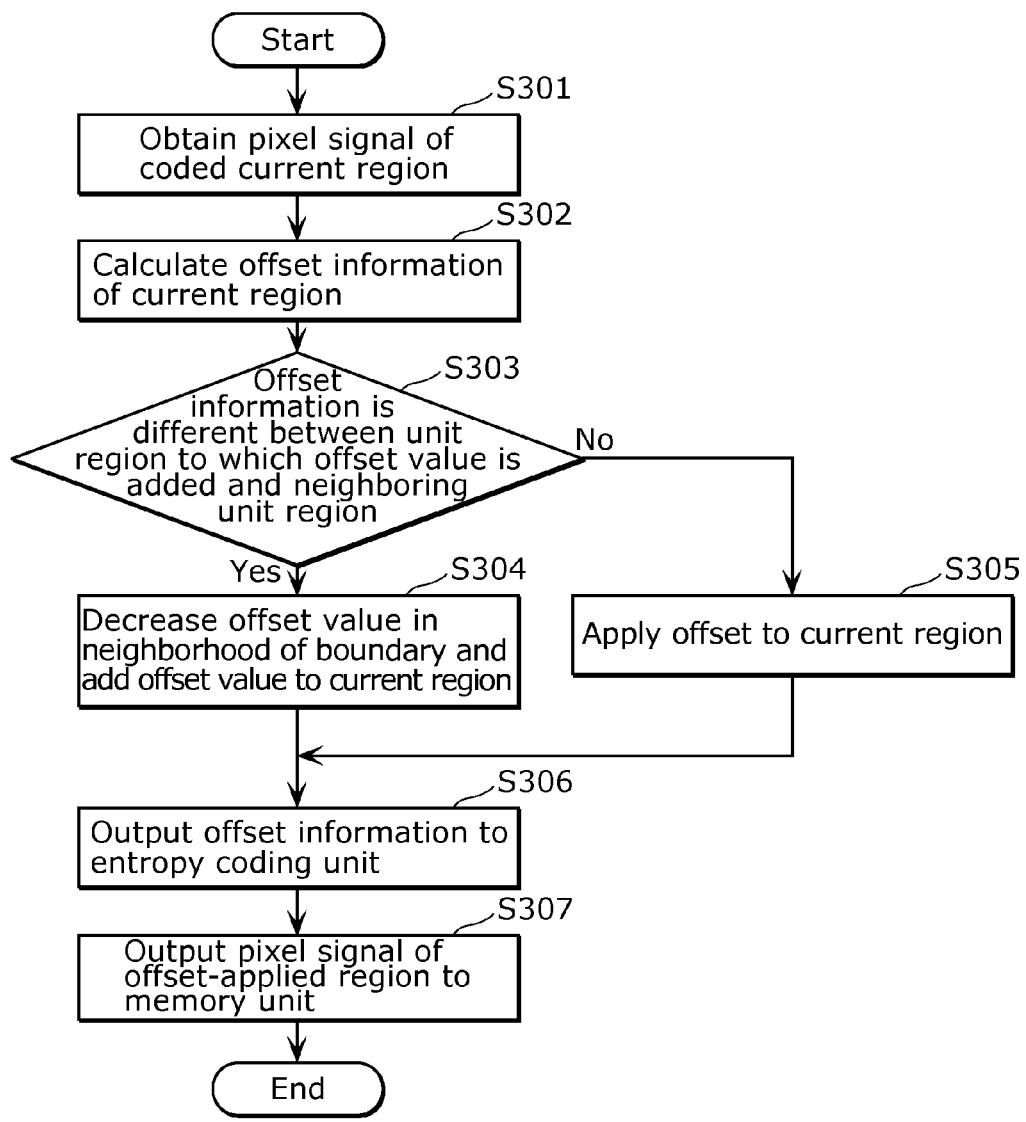
FIG. 16 is a flowchart showing an exemplary operation of the loop filtering unit in the image coding apparatus according to Embodiment 1 of the present invention.

FIG. 16 is a flowchart showing an operation of the loop filtering unit 300 in the image coding apparatus 100 shown in FIG. 14.

First, the signal obtainment unit 301 obtains a pixel signal of a coded current region from the adder unit 127 (S301). The current region may be a picture, a slice, or a block.

Next, the offset information calculation unit 302 calculates offset information including a pattern of partitioning, a pixel classification method, an offset value, and others which are to be used in offset processing (S302).

Adding offset values in the following steps are performed on a unit region which is smaller than or equal to the current region. For example, the unit region may be a subregion resulting from partitioning the current region according to the pattern of partitioning calculated in S302 or a unit region smaller than the subregion.

Next, the control unit 306 determines whether or not the offset information is different between the unit region to which an offset value is added and another unit region which neighbors the region and to which an offset value is added (S303). This determination is made by comparison of pixel classification methods and the offset values between the regions.

Next, when Yes in S303, the control unit 306 controls the offset processing unit 303 so that the offset processing unit 303 classifies the pixels in the unit region into categories, decreases an offset value to be added to a unit region in the neighborhood of a boundary with another unit region having different offset information, and adds an offset value to each of the pixels on a per-category basis (S304).

When No in S303, the offset processing unit 303 classifies pixels in the unit region into categories using offset information and performs offset by adding an offset value to each of the pixels on a per-category basis (S305).

Next, the offset information output unit 304 outputs the offset information including the pattern of partitioning, pixel classification method, and offset value to the entropy coding unit 124 (S306).

Then, the signal output unit 305 outputs a pixel signal of the current region to which offset has been applied to the memory unit 129 (S307).

Figure 17:
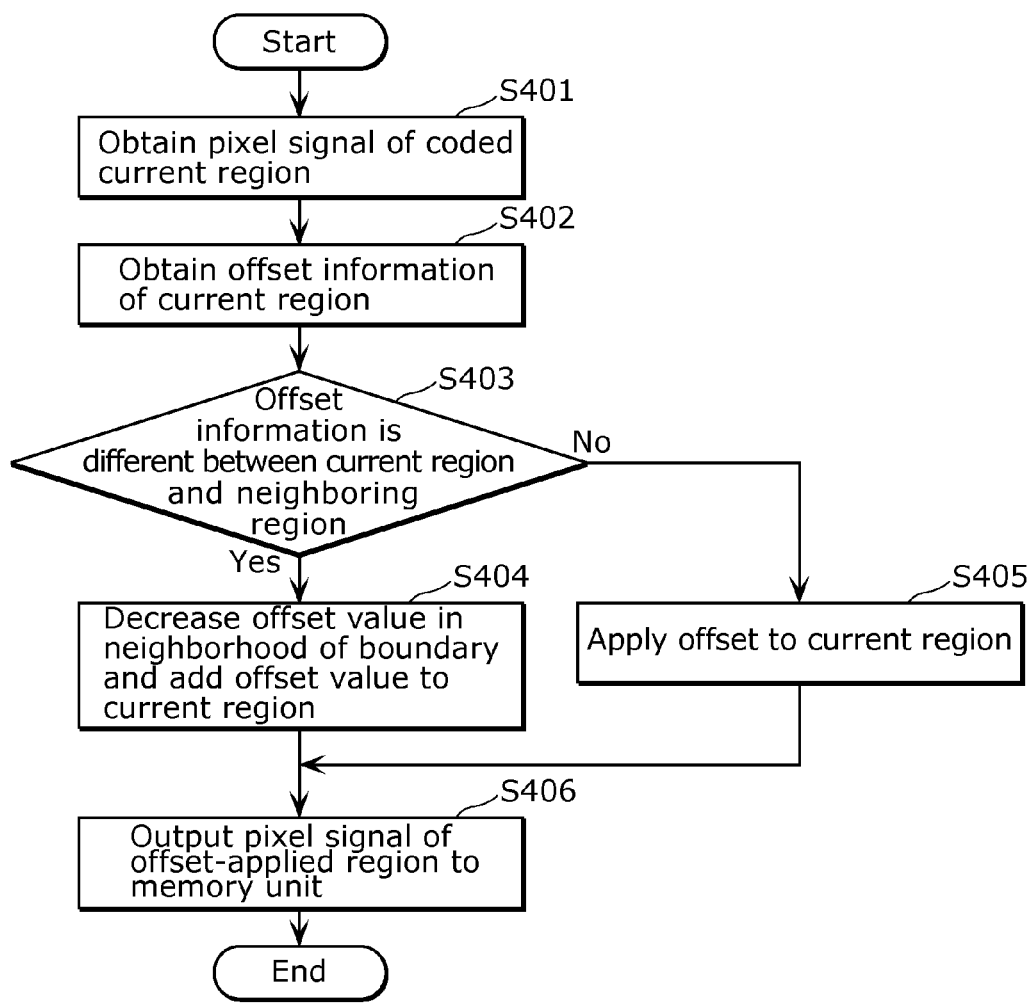
FIG. 17 is a flowchart showing an exemplary operation of the loop filtering unit in the image decoding apparatus according to Embodiment 1 of the present invention.

FIG. 17 is a flowchart showing an operation of the loop filtering unit 400 in the image decoding apparatus 200 shown in FIG. 15.

First, the signal obtainment unit 401 obtains a pixel signal of a coded current region from the adder unit 227 (S401). The current region may be a picture, a slice, or a block.

Next, the offset information calculation unit 402 obtains a pattern of partitioning, a pixel classification method, an offset value, and others which are to be used in offset processing (S402). The current region in S401 may be the same as a section in the pattern of partitioning obtained in S402 or may be different therefrom.

Next, the control unit 405 determines whether or not the offset information is different between the current region and another region which neighbors the current region (S403). This determination is made by comparison of pixel classification methods and the offset values.

Next, when Yes in S403, the control unit 405 controls the offset processing unit 403 so that the offset processing unit 403 classifies the pixels in the current region into categories, decreases an offset value to be added to a pixel in the neighborhood of a boundary with another region having different offset information, and adds an offset value to each of the pixels on a per-category basis (S404).

When No in S403, the offset processing unit 403 classifies pixels in the current region into categories and adds an offset value to each of the pixels on a per-category basis (S405).

Then, the signal output unit 404 outputs a pixel signal of the current region to which offset has been applied to the memory unit 129 (S406).

By doing this, offset values of pixels in the neighborhood of a boundary between regions having different offset information are decreased, so that occurrence of gaps between neighboring pixels on each side of the boundary can be prevented, and thereby artifacts in coded images can be decreased. The loop filtering unit 300 and the loop filtering unit 400 can thereby increase quality of subjective images to which band offset is applied.

The decreasing of offset values by the control unit 306 and the control unit 405 will be described in detail below. In the decreasing of offset values, it is necessary to determine (i) position information of a pixel for which an offset value is decreased and (ii) information of a weighting factor for the offset value.

Figure 18:
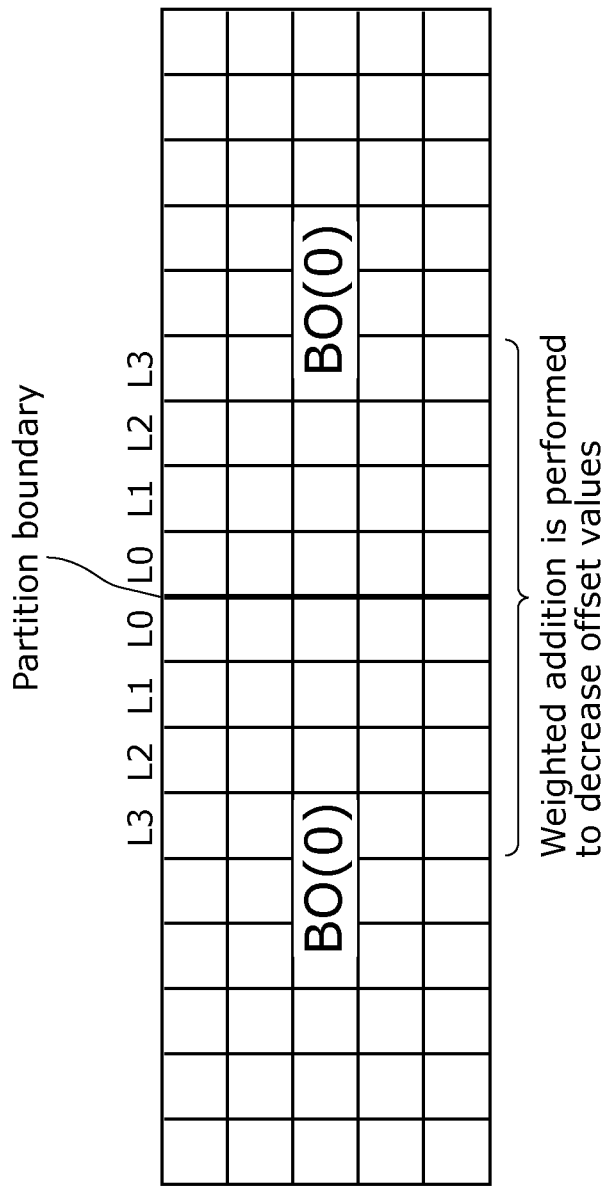
FIG. 18 schematically shows an example of application of offset according to Embodiment 1 of the present invention.

First, position information of pixels on which decreasing of offset values is performed is determined. The position information of each pixel is indicated using the total number of lines NumLine from a boundary. FIG. 18 shows an example in which NumLine=4. When a deblocking filter is applied before application of sample adaptive offset, NumLine may be determined using the total number of lines from a block boundary or may be arbitrarily specified.

Next, weighting factors WeightedOffset for the offset value are determined. For example, to decrease offset values in the lines L3, L2, L1, and L0 in FIG. 18 by bit-shifting, the shift amounts of bits for the lines are determined as an integer array such as WeightedOffset[4]={1, 2, 3, 4}. When the WeightedOffset is used, an offset value closer to the boundary is further decreased.

Alternatively, each weighting factors WeightedOffset may be determined as a factor having NumLine as a denominator and a distance from a boundary as a numerator as represented by Equation (1).

$$WeightedOffset(Dist) = \frac{Dist}{NumLine} \qquad (1)$$

Dist denotes a distance from a boundary with respect to an origin which is a pixel on the boundary. When Equation (1) is used, the weighting factors for the L3, L2, L1, and L0 in FIG. 20 are 3/4, 2/4, 1/4, and 0/4, respectively.

Alternatively, each of the weighting factors WeightedOffset may be determined according to an absolute value of an offset value as represented by Equation (2).

$$WeightedOffset(\text{Offset}) = \frac{a}{|\text{Offset}|} \qquad (2)$$

Offset denotes an offset value, and a denotes a coefficient. When this is applied, an offset value having a greater absolute value is decreased more in the neighborhood of a boundary, and thereby increase in difference between DC components on both sides of the boundary is prevented.

Optionally, weighting factors WeightedOffset may be set so that the amount of decrease non-linearly increases toward a boundary or may be adjusted manually.

Figure 19:
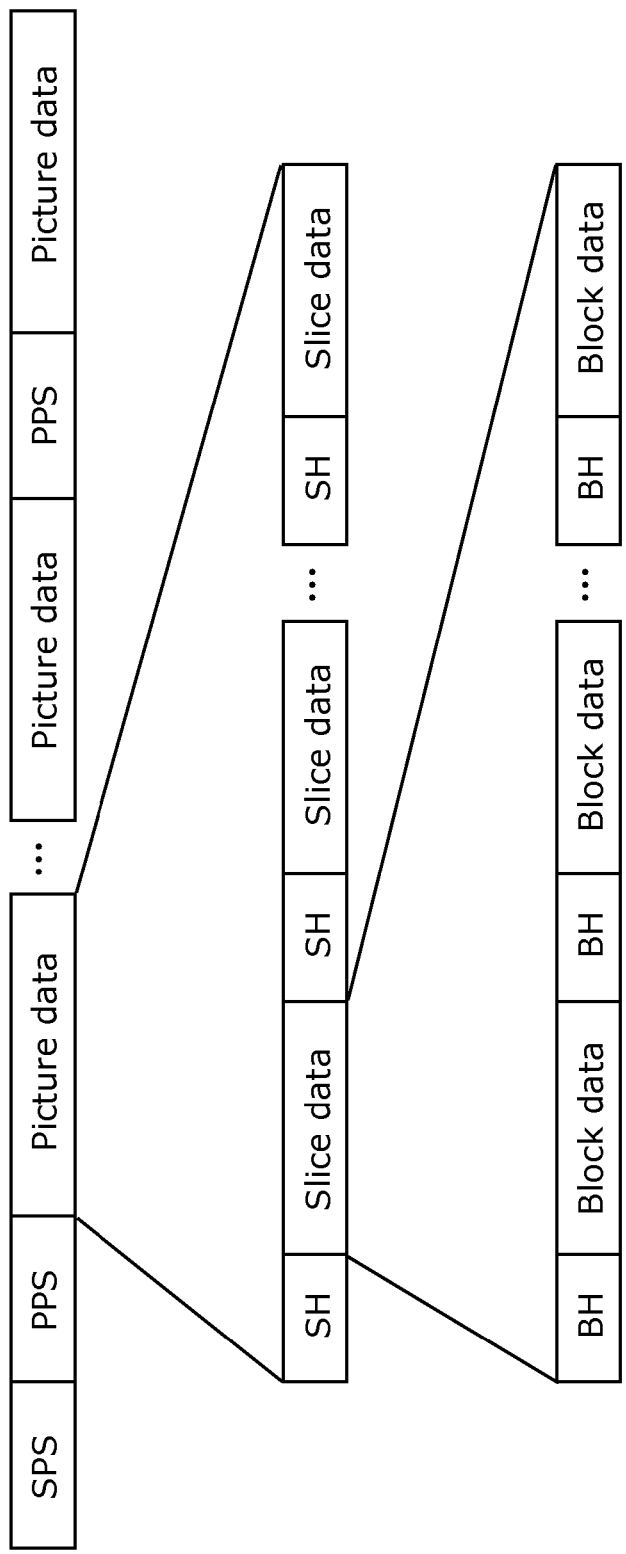
FIG. 19 schematically shows an example of a coded stream according to Embodiment 1 of the present invention.

Optionally, the total number of lines from a boundary NumLine and the weighting factors WeightedOffset for offset values may be coded and included in a coded stream. FIG. 19 schematically shows an example of a coded stream according to Embodiment 1 of the present invention.

The image coding apparatus 100 according to Embodiment 1 of the present invention codes a moving picture to generate a coded stream. The coded stream includes a header and picture data as shown in FIG. 19. The header includes a sequence parameter set (SPS) and a picture parameter set (PPS). The picture data is coded image data. The picture data further includes a slice header (SH) and slice data. The slice data includes coded image data included in a slice. The slice data further includes a block header (BH) and block data. The block data includes coded image data included in a block.

The block is an exemplary processing unit of coding of a picture and corresponds to a plurality of regions resulting from partitioning a picture. The block may be partitioned into further smaller units of processing. FIG. 20 shows an example in which the number of lines NumLine from a boundary and weighting factors WeightedOffset for offset values are inserted in SH. This shows an exemplary case where the number of lines NumLine is represented by a positive integer and weighting factors WeightedOffset for offset values are represented by an array of positive integers. The positive integer indicates the number of lines on which decreasing of offset values are performed. The array of positive integers indicates shift amounts of bits for the lines. Alternatively, the total number of lines NumLine from a boundary and weighting factors WeightedOffset for an offset value may be inserted in an SPS, a PPS, or a BH.

Although the image coding apparatus and the image decoding apparatus according to the present invention have been described above based on the embodiments, the present invention is not limited to these embodiments. The present invention further includes various variations of the embodiments which will occur to those skilled in the art, and other embodiments in which constituent elements of different embodiments are combined.

For example, processing which is executed by a particular processing unit may be executed by another processing unit. Furthermore, the order of steps in a process may be changed, and a plurality of processes may be executed in parallel. Furthermore, an additional dedicated or shared memory unit for storing various information items may be included in the configurations.

Furthermore, the present invention can be implemented not only as the image coding apparatus or the image decoding apparatus but also as a method which includes, as steps, the processing units included in the image coding apparatus or the image decoding apparatus. For example, these steps are executed by a computer. In addition, the present invention can be implemented as a program which causes a computer to execute these steps included in the method. Furthermore, the present invention can be implemented as a non-transitory computer-readable recording medium such as a compact disc read-only memory (CD-ROM) on which the program has been recorded.

The constituent elements included in the image coding apparatus and the image decoding apparatus may be implemented as a large scale integration (LSI) that is an integrated circuit. These constituent elements may be each formed into a single chip, or all or part of them may be formed into a single chip. For example the constituent elements other than the memory unit may be formed into a single chip. Although the circuit is referred to as "LSI" herein, designations such as IC (Integrated Circuit), system LSI, super LSI, or ultra-LSI may be used instead depending on the level of circuit integration.

The method of forming integrated circuitry is not limited to use of an LSI. Dedicated circuitry or a general-purpose processor may be used instead of an LSI. Field Programmable Gate Array (FPGA) that allows for programming or a reconfigurable processor that allows re-configuration of connections and configuration of an LSI is also applicable.

Furthermore, in the event that advancement in or derivation from semiconductor technology brings about an integrated circuitry technology whereby an LSI is replaced, the constituent elements included in the image coding apparatus and the image decoding apparatus may be obviously integrated using the new technology.

Embodiment 2

Figure 21:
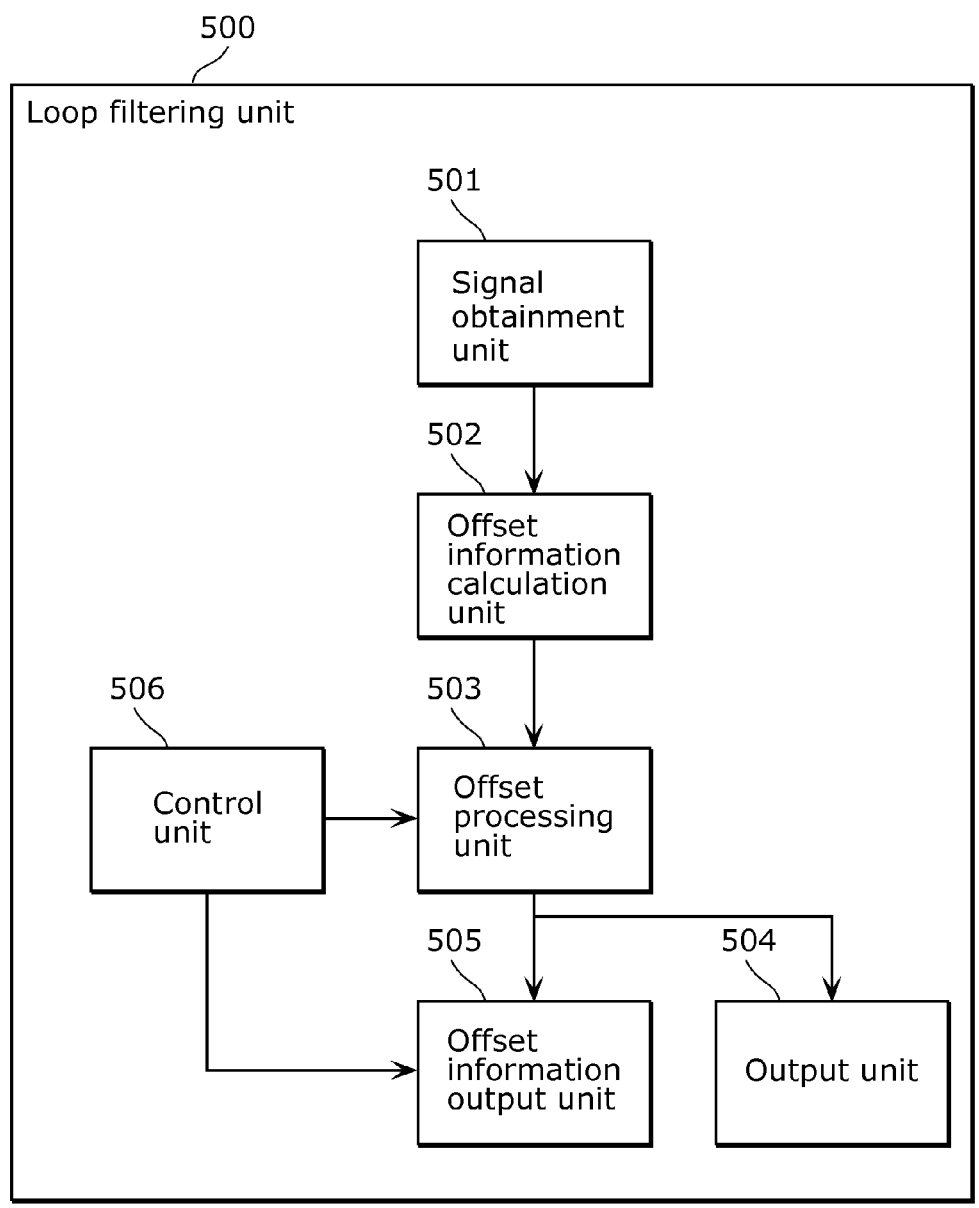
FIG. 21 is a block diagram showing an exemplary configuration of a loop filtering unit in an image coding apparatus according to Embodiment 2 of the present invention.

A configuration of a loop filtering unit 500 in an image coding apparatus according to Embodiment 2 will be described below. FIG. 21 is a block diagram showing an exemplary configuration of the loop filtering unit 500 including constituent elements characteristic to the image coding apparatus according to Embodiment 2. As will be described later, the loop filtering unit 500 according to Embodiment 2 in the present invention corresponds to part of the image coding apparatus 100 which compresses and codes an image signal and outputs coded image data.

The loop filtering unit 500 includes a signal obtainment unit 501, an offset information calculation unit 502, an offset processing unit 503, an offset information output unit 504, a signal output unit 505, and a control unit 506. The control unit 506 may be included in the control unit 110 shown in FIG. 1.

The signal obtainment unit 501 obtains a pixel signal of a coded current region.

The offset information calculation unit 502 calculates a pattern of partitioning, a pixel classification method, an offset value, and others for use in offset processing.

The offset processing unit 503 classifies pixels in a current region into categories using offset information and applies offset on a per-category basis.

The offset information output unit 504 outputs offset information to the entropy coding unit 124 shown in FIG. 1.

The signal output unit 505 outputs a current region to which offset has been applied.

The control unit 506 controls the offset which the offset processing unit 503 performs.

Figure 22:
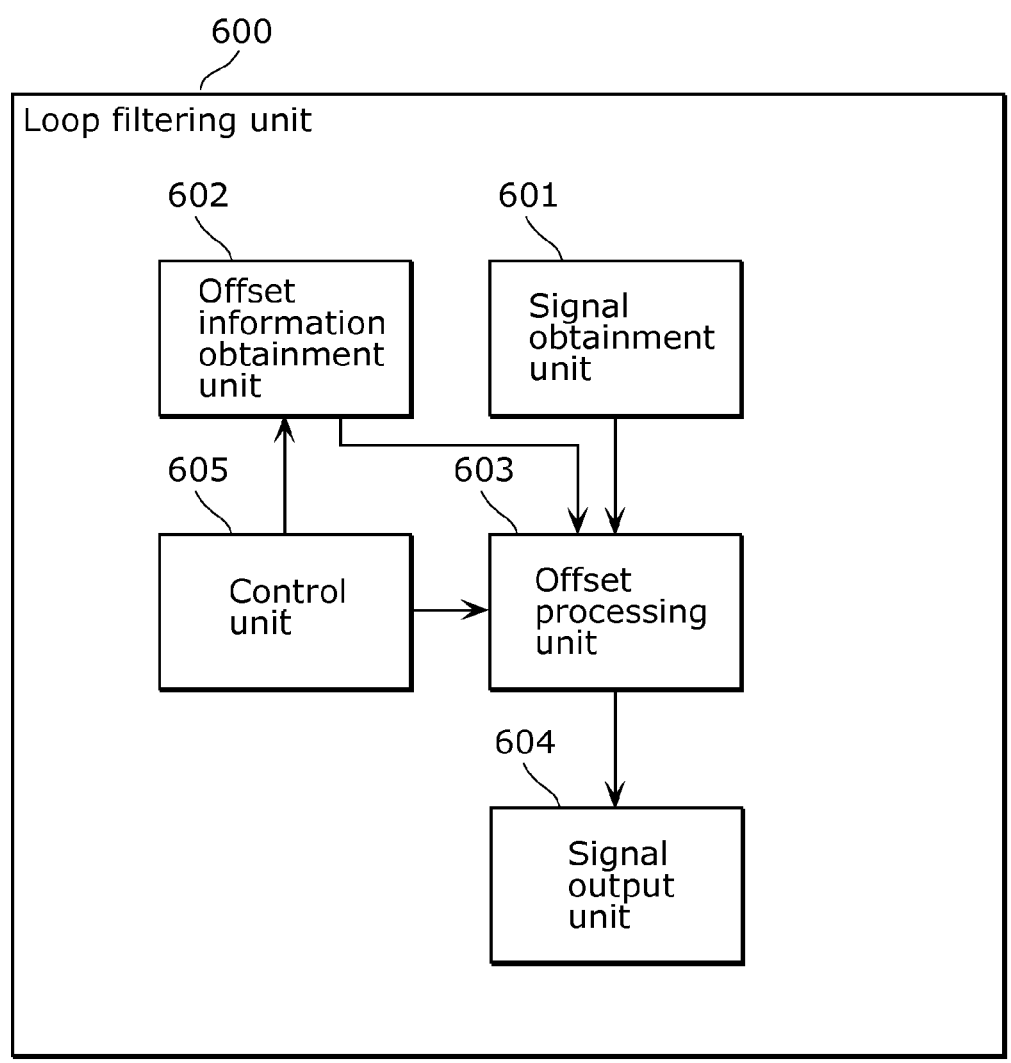
FIG. 22 is a block diagram showing an exemplary configuration of a loop filtering unit in an image decoding apparatus according to Embodiment 2 of the present invention.

FIG. 22 shows an exemplary configuration of a loop filtering unit 600 including constituent elements characteristic to the image decoding apparatus corresponding to the image coding apparatus according to Embodiment 2. As will be described later, the loop filtering unit 600 according to Embodiment 2 of the present invention corresponds to part of the image decoding apparatus 200 which decodes a coded signal and outputs decoded image data.

The loop filtering unit 600 includes a signal obtainment unit 601, an offset information calculation unit 602, an offset processing unit 603, a signal output unit 604, and a control unit 605. The control unit 606 may be included in the control unit 210 shown in FIG. 2.

The signal obtainment unit 601 obtains a pixel signal of a coded current region.

The offset information calculation unit 602 obtains a pattern of partitioning, a pixel classification method, an offset value, and others which are to be used in offset processing.

The offset processing unit 603 classifies pixels in a current region into categories using offset information and applies offset on a per-category basis.

The signal output unit 604 outputs a current region to which offset has been applied.

The control unit 605 controls the offset which the offset processing unit 603 performs.

Figure 23:
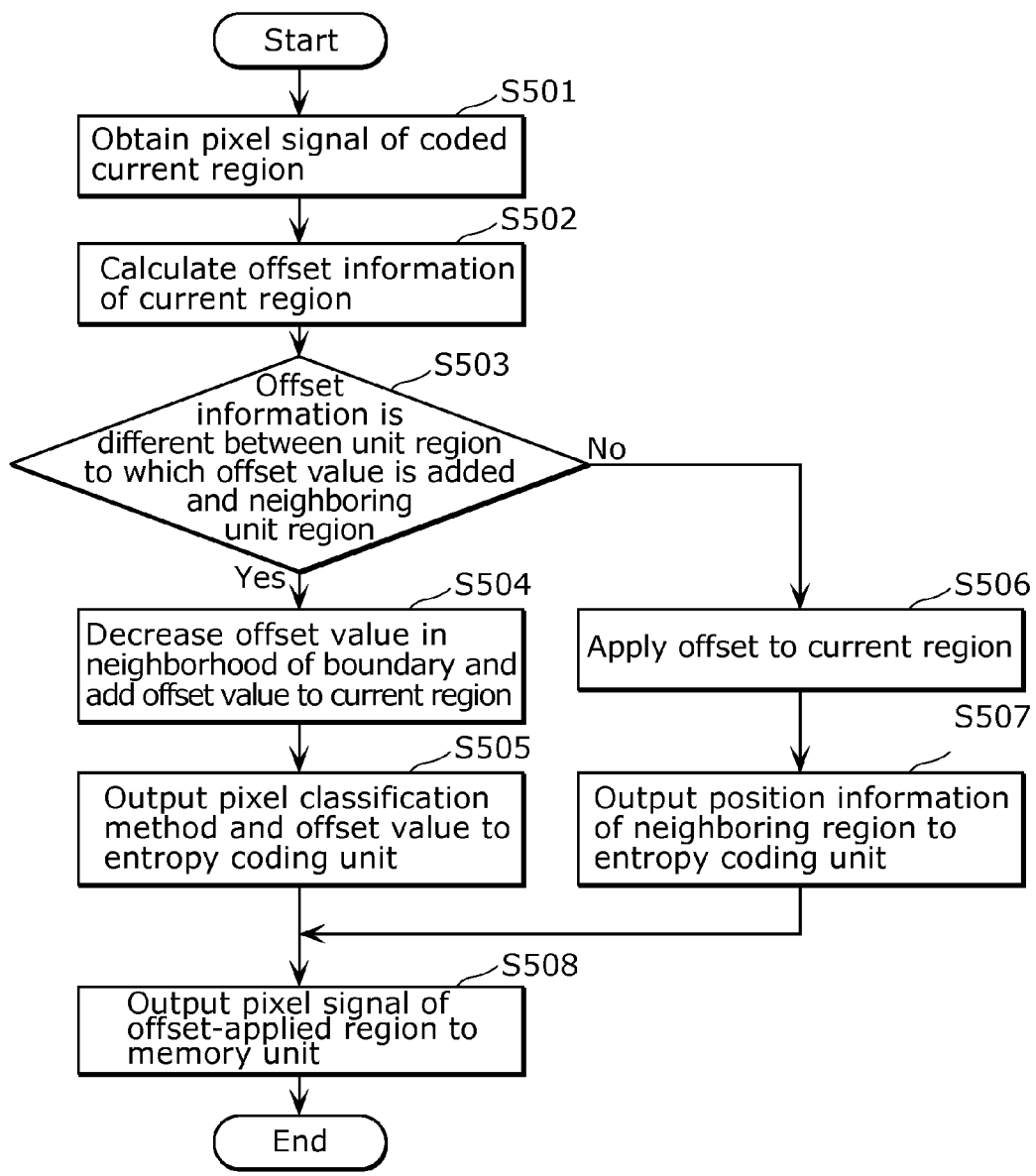
FIG. 23 is a flowchart showing an exemplary operation of the loop filtering unit in the image coding apparatus according to Embodiment 2 of the present invention.

FIG. 23 is a flowchart showing an operation of the loop filtering unit 500 in the image coding apparatus 100 shown in FIG. 21.

First, the signal obtainment unit 501 obtains a pixel signal of a coded current region from the adder unit 127 (S501). The current region may be a picture, a slice, or a block.

Next, the offset information calculation unit 502 calculates a pattern of partitioning, a pixel classification method, an offset value, and others which are to be used in offset processing (S502).

Adding offset values in the following steps are performed on a unit region smaller than or equal to the current region. For example, the unit region may be a subregion resulting from partitioning the current region according to the pattern of partitioning calculated in S502 or a unit region smaller than the subregion.

Next, the control unit 506 determines whether or not the offset information is different between the unit region to which an offset value is added and another unit region which neighbors the region and to which an offset value is added (S503). This determination is made by comparison of pixel classification methods and the offset values between a unit region to which an offset value is added and at least one of eight regions neighboring the unit region.

Next, when. Yes in S503, the control unit 506 controls the offset processing unit 503 so that the offset processing unit 503 classifies the pixels in the unit region into categories, decreases an offset value to be added to a region in the neighborhood of a boundary with another unit region having different offset information, and adds an offset value to each of the pixels on a per-category basis (S504).

Next, the offset information output unit 504 outputs information indicating obtainment of offset information from a coded stream, the pixel classification method, and the offset value to the entropy coding unit 124 (S505). At this time, under the control of the control unit 506, the offset information is inserted in a position in a coded stream according to a unit region for addition of an offset value. For example, when the unit region for addition of an offset value is a block, offset information is inserted in BH.

When No in S503, the offset processing unit 503 classifies pixels in the unit region into categories using offset information and adds an offset value to each of the pixels on a per-category basis (S506).

Next, the offset information output unit 504 outputs, to the entropy coding unit 124, information indicating a direction of a neighboring unit region having the same offset information (S507). At this time, under the control of the control unit 506, the offset information is inserted in a position in a coded stream according to a unit region for addition of an offset value. For example, when the unit region for addition of an offset value is a block, offset information is inserted in BH.

Then, the signal output unit 505 outputs a pixel signal of the current region to which offset has been applied to the memory unit 129 (S508).

Figure 24:
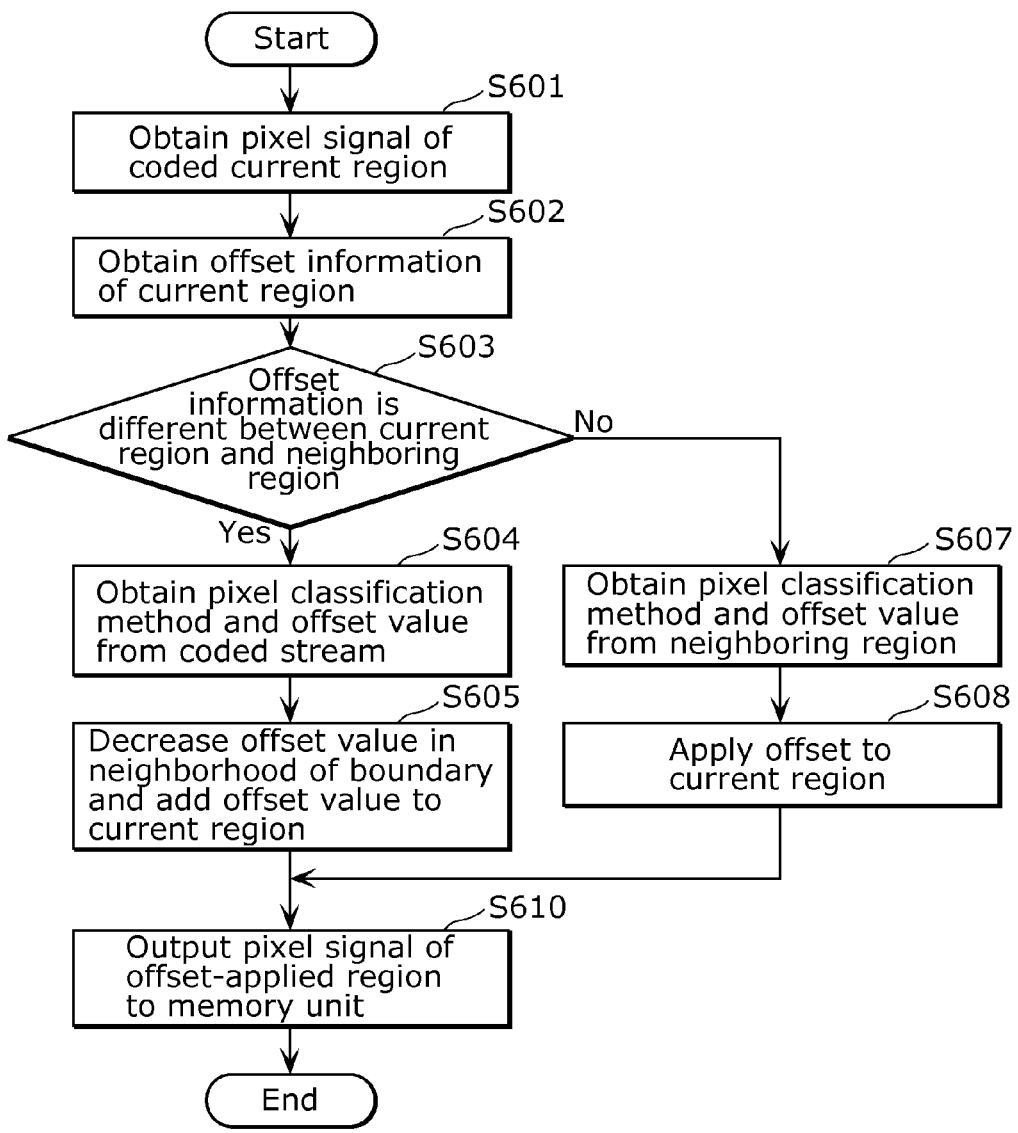
FIG. 24 is a flowchart showing an exemplary operation of the loop filtering unit in the image decoding apparatus according to Embodiment 2 of the present invention.

FIG. 24 is a flowchart showing an operation of the loop filtering unit 600 in the image decoding apparatus 200 shown in FIG. 22.

First, the signal obtainment unit 601 obtains a pixel signal of a coded current region from the adder unit 227 (S601). The current region may be a picture, a slice, or a block.

Next, the offset information obtainment unit 602 obtains, from a coded stream, information indicating a position from which pixel classification method and an offset value which are to be used for a current region are obtained (S602).

Next, the control unit 605 determines whether or not the offset information is different between the current region and another region which neighbors the current region (S603). This determination is made using the information indicating the position from which offset information is obtained in S602. When the information indicating the position from which offset information is obtained indicates a coded stream, the result of the determination is Yes. When the information indicating the position from which offset information is obtained indicates a neighboring current region, the result of the determination is No.

Next, when Yes in S603, the control unit 605 controls the offset information obtainment unit 602 so that the offset information obtainment unit 602 obtains a pixel classification method and an offset value from a coded stream (S604).

Next, the control unit 605 controls the offset processing unit 603 so that the offset processing unit 603 classifies the pixels in the current region into categories, decreases an offset value to be added to a pixel in the neighborhood of a boundary with another region having different offset information, and adds an offset value to each of the pixels on a per-category basis (S605).

When No in S603, the control unit 605 obtains a pixel classification method and an offset value used for the neighboring current region indicated by the information obtained in S603 and indicating the position from which offset information is obtained (S607).

Next, the offset processing unit 603 classifies pixels in the current region into categories and adds an offset value to each of the pixels on a per-category basis (S608).

Then, the signal output unit 604 outputs a pixel signal of the current region to which offset has been applied to the memory unit 129 (S610).

The decreasing of an offset value and obtainment of offset information by the control unit 506 and the control unit 605 will be described in detail below. In the following, description regarding the decreasing of an offset value and already set forth for Embodiment 1 will be omitted.

Figure 25:
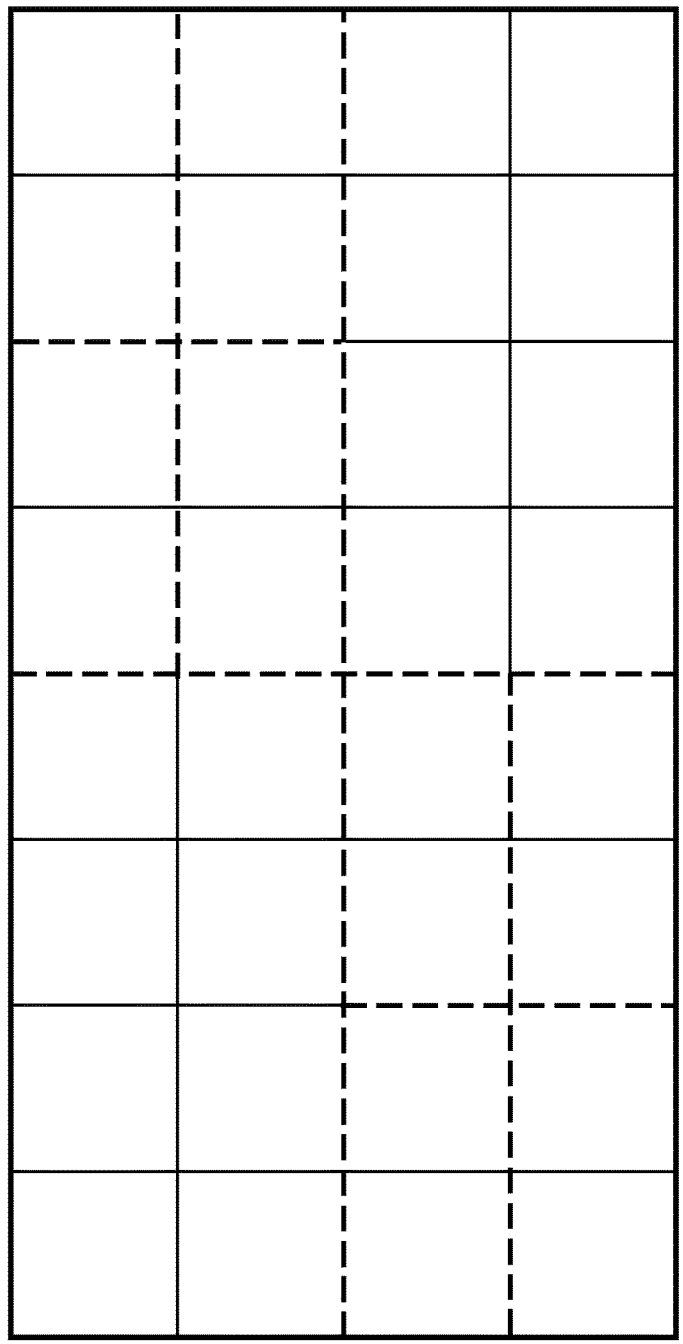
FIG. 25 is a block diagram showing an example of a unit of processing by a loop filtering unit in an image decoding apparatus according to Embodiment 2 of the present invention.
Figure 26:
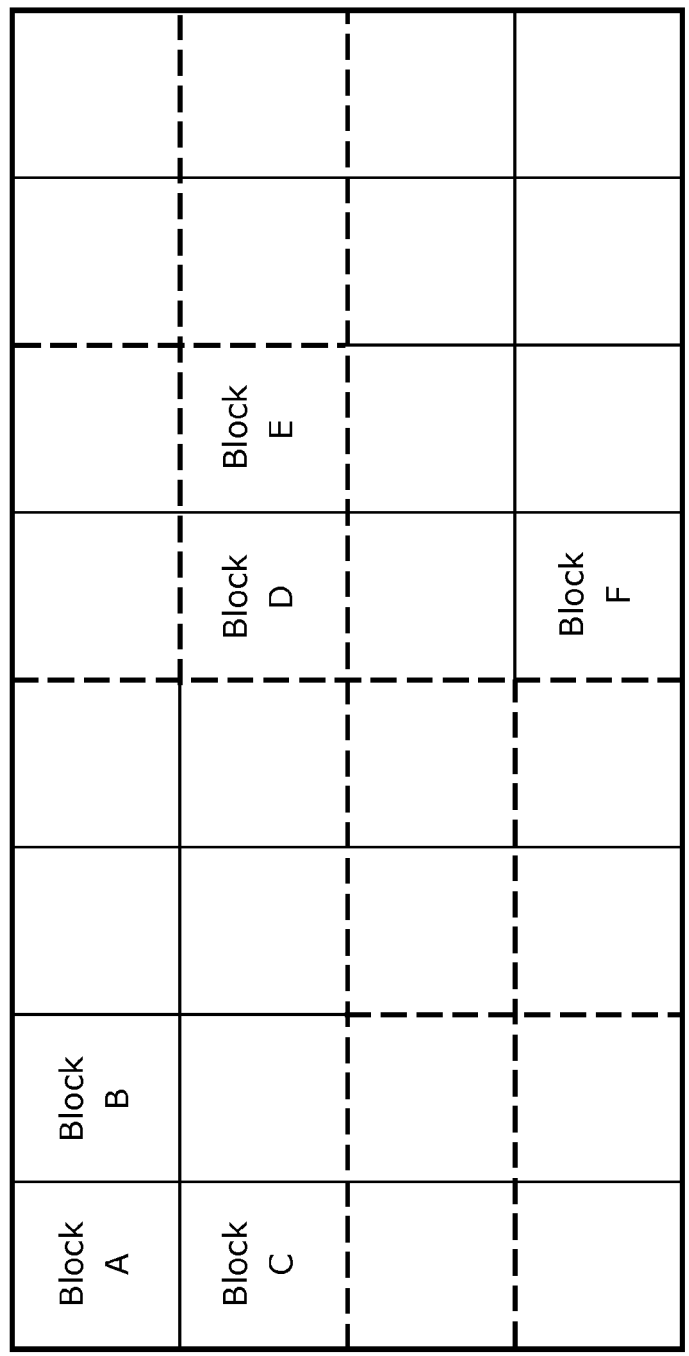
FIG. 26 schematically shows an example of decrease of offset values by the loop filtering unit in the image decoding apparatus according to Embodiment 2 of the present invention.

For the purpose of avoiding delay and simplifying a hardware configuration, the image decoding apparatus 200 performs loop filtering in the order of raster scanning on a per-block basis as shown in FIG. 25 regardless of the current region and the pattern of partitioning in loop filtering by the image coding apparatus 100. In FIG. 25, the region defined by a thick solid line is a current region for the image coding apparatus 100. The current region set forth in the standard of HEVC is described as a slice in Non Patent Literature 3, but the current region is not limited to this. In FIG. 25, the regions defined by thick dashed lines are subregions resulting from partitioning according to a pattern of partitioning. For each of the regions, one pixel classification method and one offset value are used. In FIG. 25, the regions defined by thin solid lines are current blocks for the image decoding apparatus 200. The current block set forth in the standard of HEVC is described as a largest coding unit (LCU) in Non Patent Literature 3, but the current block is not limited to this. Accordingly, a pixel classification method and an offset value of the current block may be identical to those of its neighboring block. When this is the case, information indicating a position from which offset information is obtained is coded for each block in order to avoid redundancy of coding of the same pixel classification method and the same offset value for each block. FIG. 26 shows an example for this. Offset information for the initial block in each region in a pattern of partitioning calculated by the coding apparatus 100 (for example, a block A or a block D) is obtained from a coded stream. For the block in each region in a pattern of partitioning (for example, a block B or a block E), the pixel classification method and offset value used for the left neighboring block are used. For a block having no left neighboring block or for a block in a different region in a pattern of partitioning (for example, a block C or a block F), a pixel classification method and an offset value used for an upper neighboring block are used. When offset information used for a neighboring block is used for a current block, decreasing of the offset value is not performed because no error across a boundary occurs.

Figure 27A:
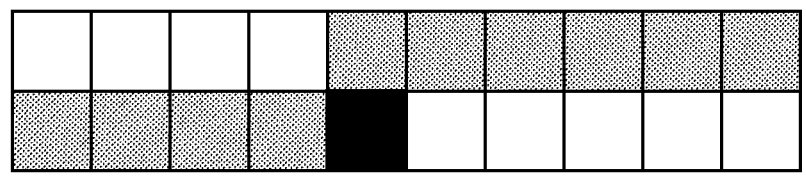
FIG. 27A schematically shows an example of decrease of offset values by the loop filtering unit in the image decoding apparatus according to Embodiment 2 of the present invention.

Optionally, offset information used for a neighboring block may be stored in order to increase accuracy in decrease of an offset value. The stored offset information includes at least one of a position from which the offset information is obtained, a pixel classification method, and an offset value. FIG. 27A shows an example for this. The region in black indicates a current block, and the regions in gray indicate blocks for which offset information has been used is stored. In this example, it is possible to determine for the upper neighboring block and the left neighboring block whether or not the offset information used is the same as offset information used for the current block. This makes it possible to decrease offset values in the neighborhood of the border with the upper neighboring block or the left neighboring block.

Figure 27B:
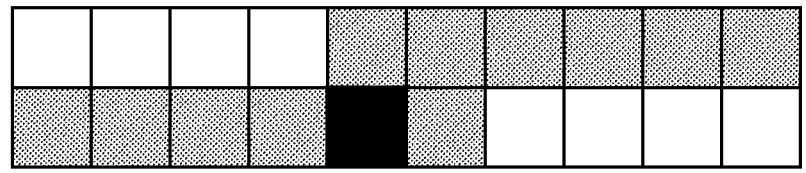
FIG. 27B schematically shows an example of decrease of offset values by the loop filtering unit in the image decoding apparatus according to Embodiment 2 of the present invention.
Figure 27C:
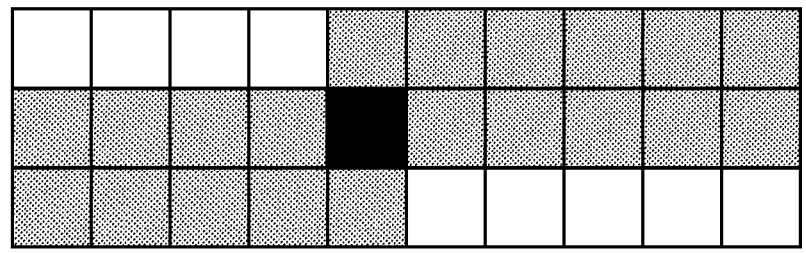
FIG. 27C schematically shows an example of decrease of offset values by the loop filtering unit in the image decoding apparatus according to Embodiment 2 of the present invention.

When there is a delay of one block as shown in FIG. 27B, it is possible to decrease offset values in the neighborhood of the border with the upper neighboring block, the left neighboring block, or the right neighboring block. When there is a delay of one line as shown in FIG. 27C, it is possible to decrease offset values in the neighborhood of the border with the upper neighboring block, the lower neighboring block, the left neighboring block, or the right neighboring block.

Although the image coding apparatus and the image decoding apparatus according to the present invention have been described above based on the embodiments, the present invention is not limited to these embodiments. The present invention includes various variations of the embodiments which will occur to those skilled in the art, and other embodiments in which constituent elements of different embodiments are combined.

For example, processing which is executed by a particular processing unit may be executed by another processing unit. Furthermore, the order of steps in a process may be changed, and a plurality of processes may be executed in parallel. Furthermore, an additional dedicated or shared memory unit for storing various information items may be included in the configurations.

Furthermore, the present invention can be implemented not only as the image coding apparatus and the image decoding apparatus, but also as a method which includes, as steps, the processing units included in the image coding apparatus or the image decoding apparatus. For example, these steps are executed by a computer. In addition, the present invention can be implemented as a program which causes a computer to execute these steps included in the method. Furthermore, the present invention can be implemented as a non-transitory computer-readable recording medium such as a compact disc read-only memory (CD-ROM) on which the program has been recorded.

The constituent elements included in the image coding apparatus and the image decoding apparatus may be implemented as a large scale integration (LSI) that is an integrated circuit. These constituent elements may be each formed into a single chip, and all or part of them may be formed into a single chip. For example the constituent elements other than the memory unit may be formed into a single chip. Although the circuit is referred to as "LSI" herein, designations such as IC (Integrated Circuit), system LSI, super LSI, or ultra-LSI may be used instead depending on the level of circuit integration.

The method of forming integrated circuitry is not limited to use of an LSI. Dedicated circuitry or a general-purpose processor may be used instead of an LSI. Field Programmable Gate Array (FPGA) that allows for programming or a reconfigurable processor that allows re-configuration of connections and configuration of an LSI is also applicable.

Furthermore, in the event that advancement in or derivation from semiconductor technology brings about an integrated circuitry technology whereby an LSI is replaced, the constituent elements included in the image coding apparatus and the image decoding apparatus may be obviously integrated using the new technology.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 28:
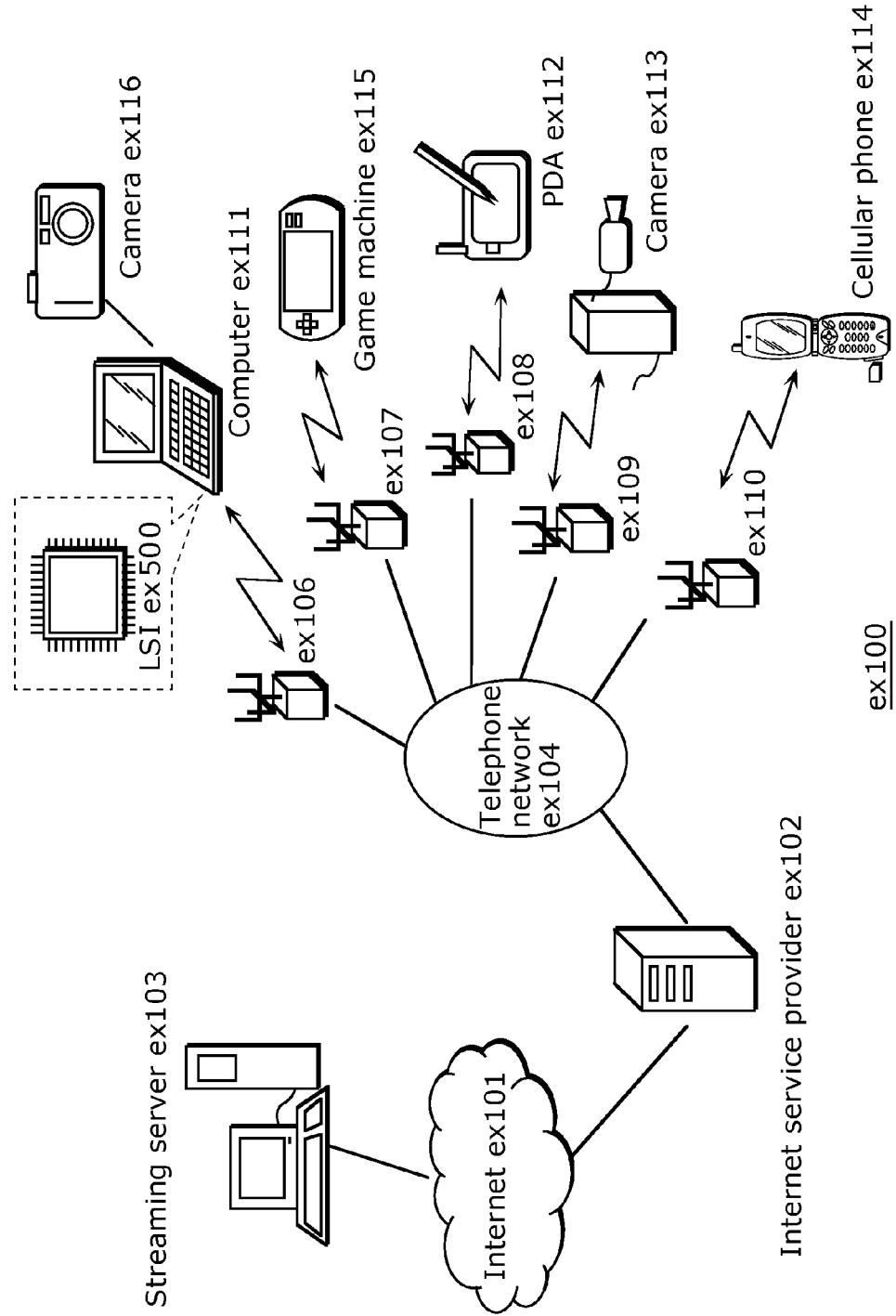
FIG. 28 shows an overall configuration of a content providing system for implementing content distribution services.

FIG. 28 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 28, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for encoding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 29:
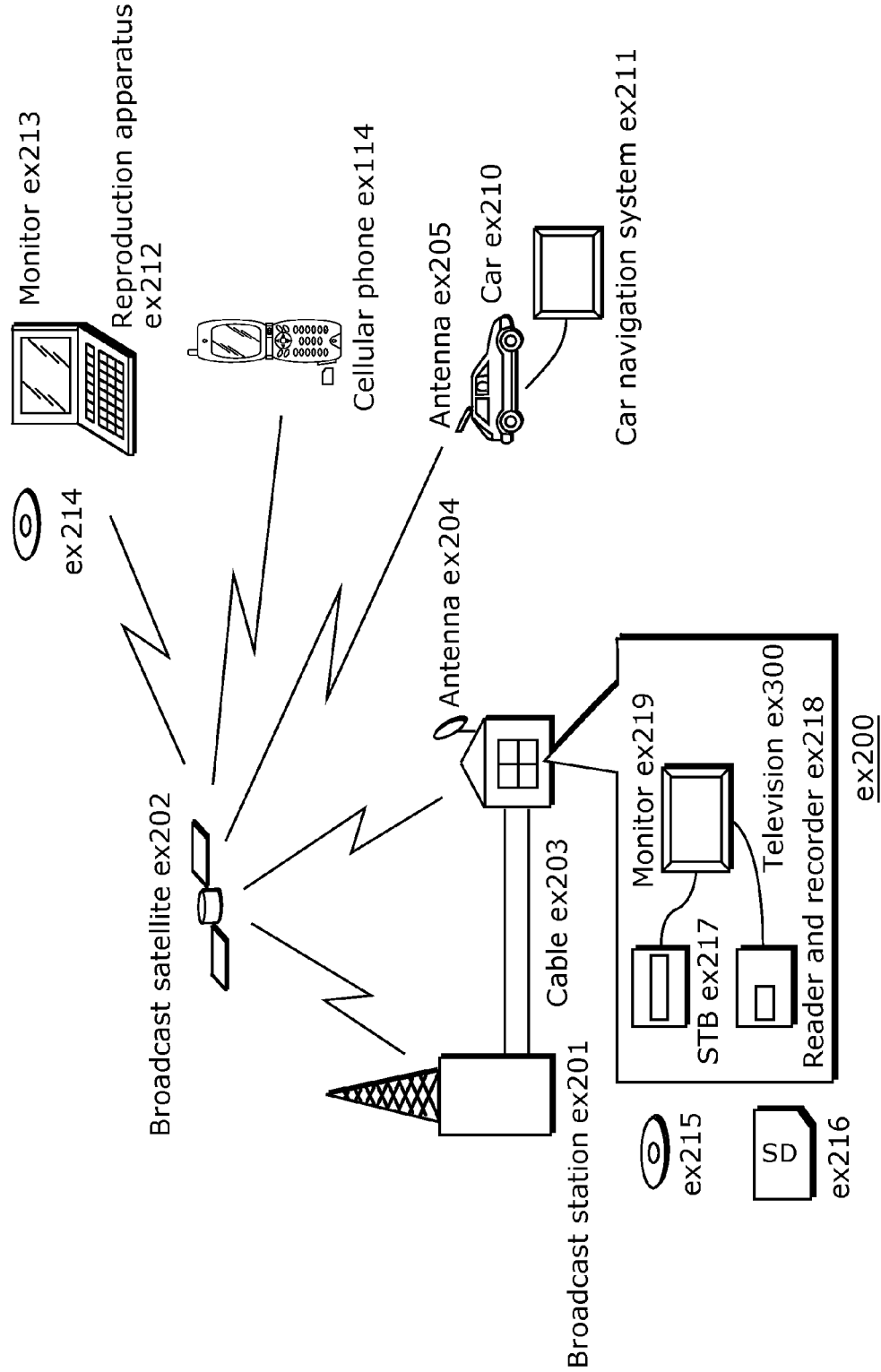
FIG. 29 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 29. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 30:
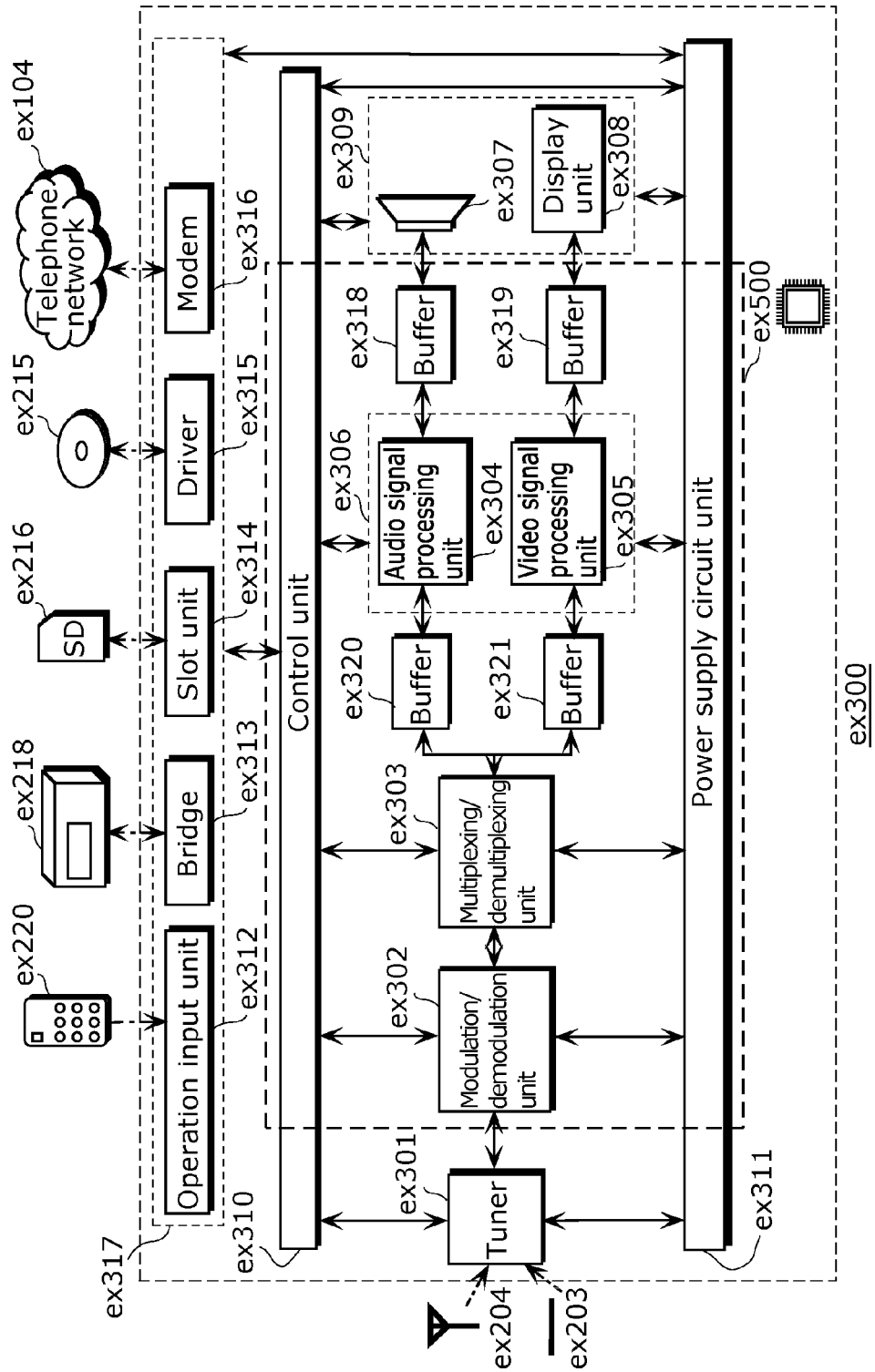
FIG. 30 shows a block diagram illustrating an example of a configuration of a television.

FIG. 30 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or encode the multiplexed data, and the television ex300 and the reader/recorder ex218 may share the decoding or encoding.

Figure 31:
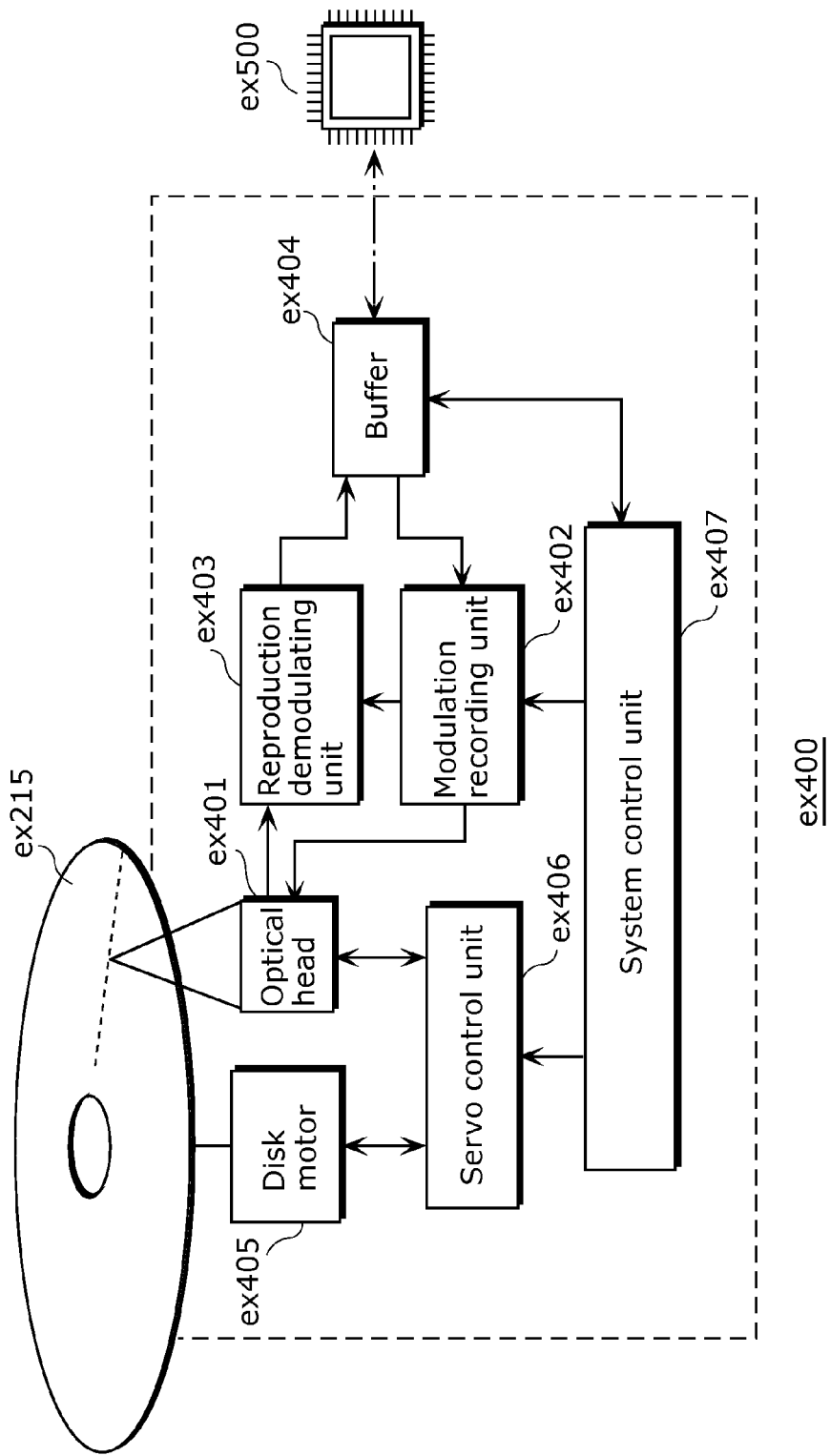
FIG. 31 shows a block diagram illustrating an example of a configuration of an information reproducing/recording unit that reads and writes information from and on a recording medium that is an optical disk.

As an example, FIG. 31 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 32:
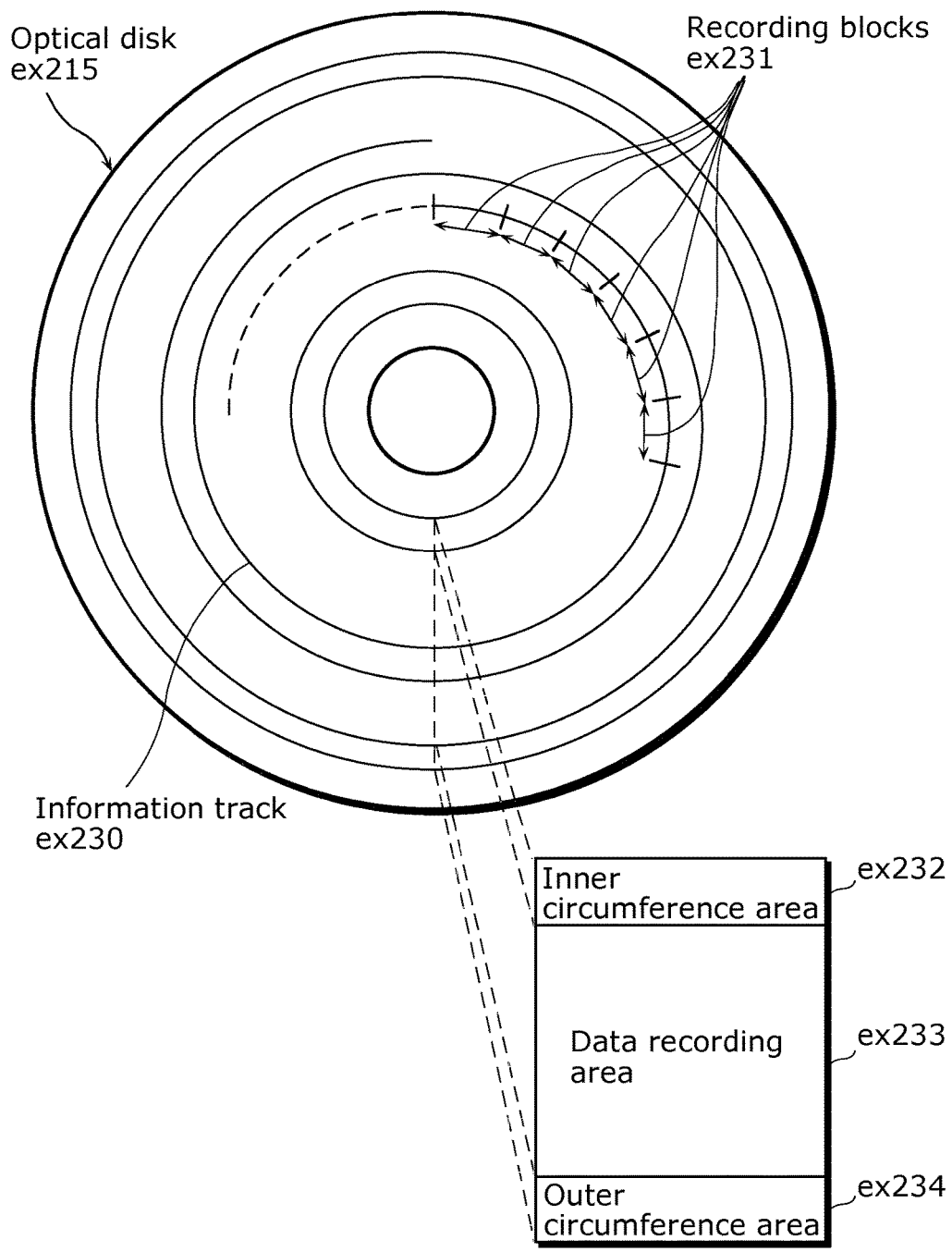
FIG. 32 shows an example of a configuration of a recording medium that is an optical disk.

FIG. 32 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 30. The same will be true for the configuration of the computer ex111, the cellular phone ex114, and others.

Figure 33A:
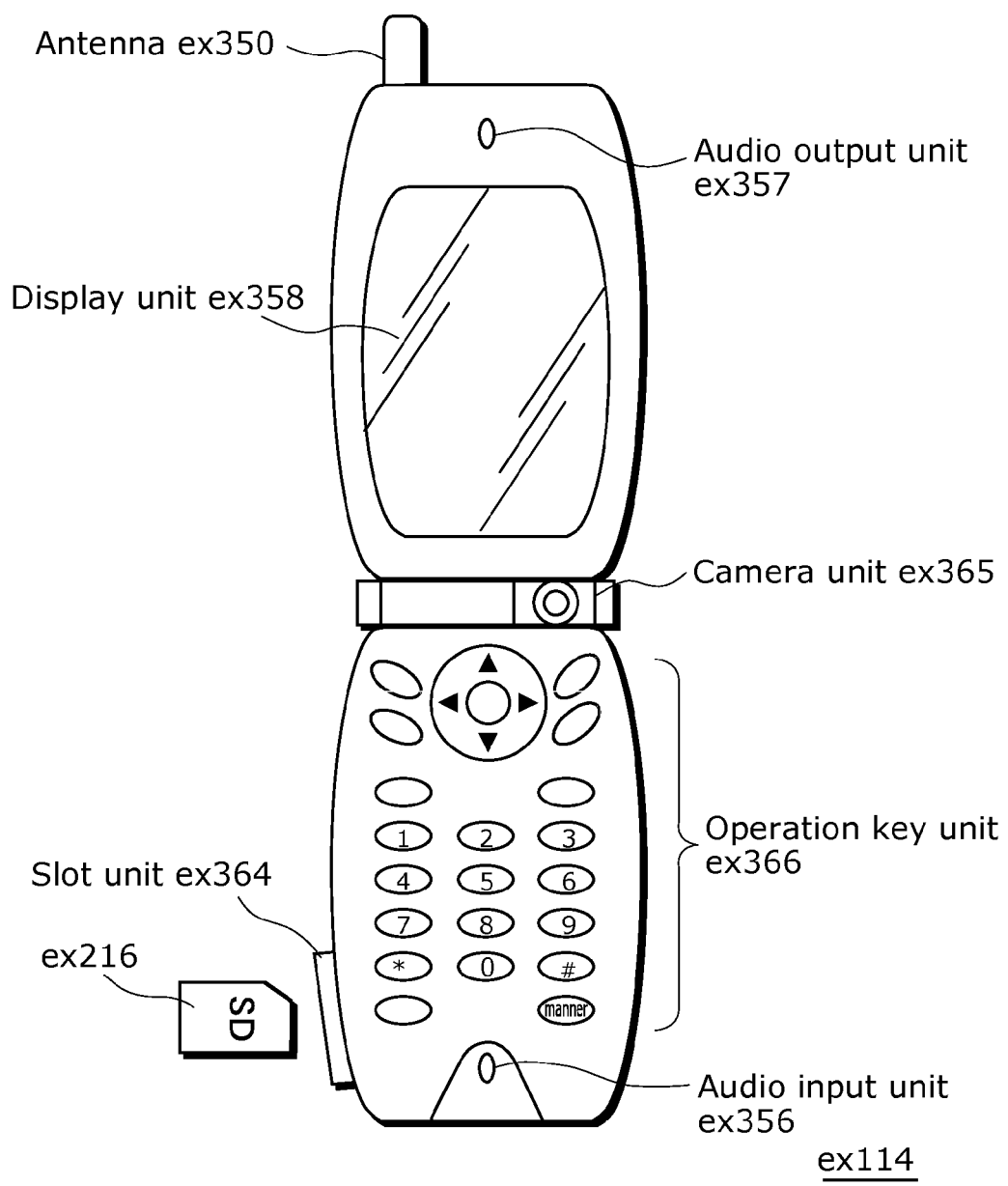
FIG. 33A shows an example of a cellular phone.

FIG. 33A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded or decoded data of the received video, the still pictures, e-mails, or others; and a slot unit ex364 that is an interface unit for a recording medium that stores data in the same manner as the memory unit ex367.

Figure 33B:
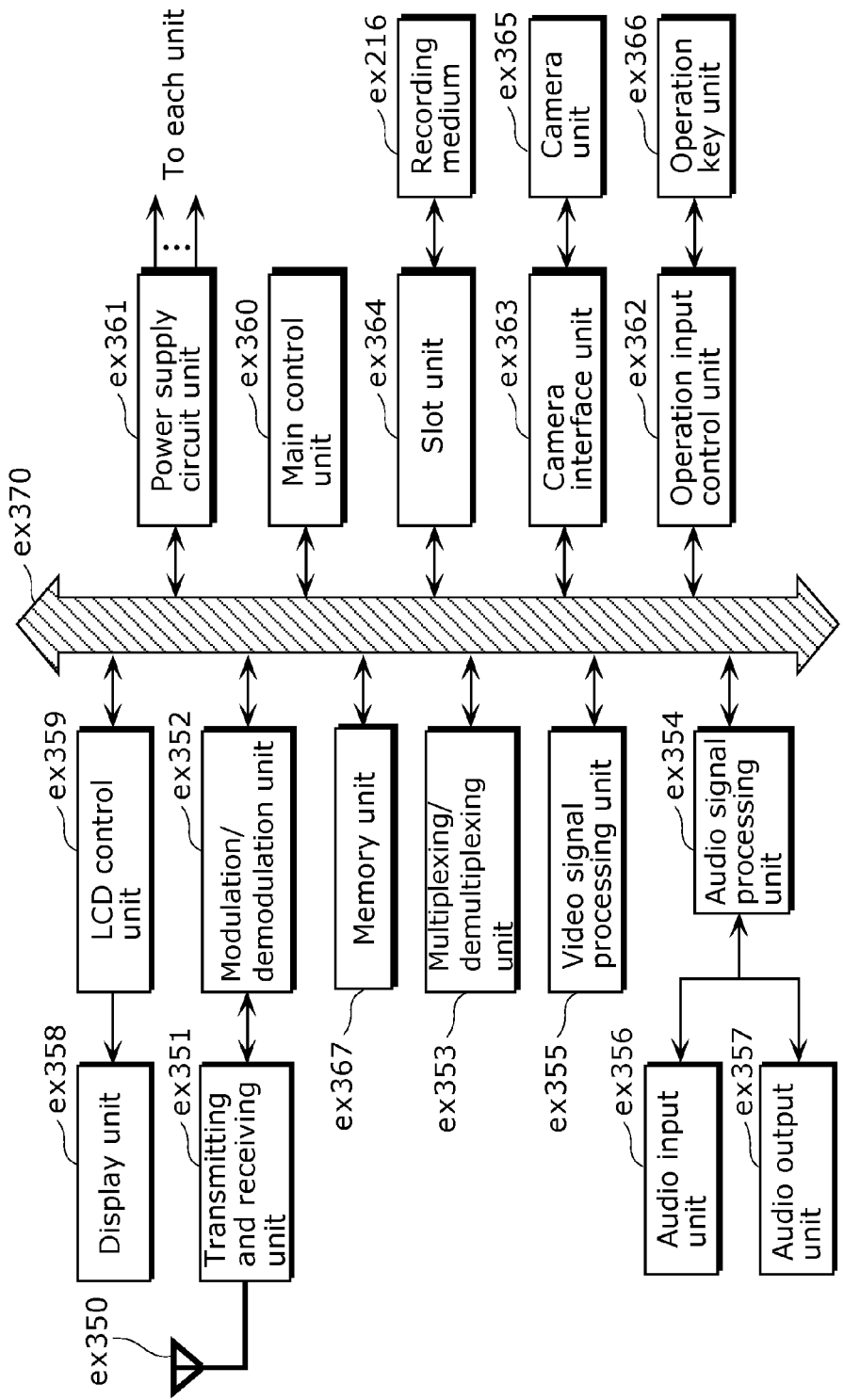
FIG. 33B is a block diagram showing an example of a configuration of a cellular phone.

Next, an example of a configuration of the cellular phone ex114 will be described with reference to FIG. 33B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-toanalog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 34 illustrates a structure of the multiplexed data. As illustrated in FIG. 34, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 35:
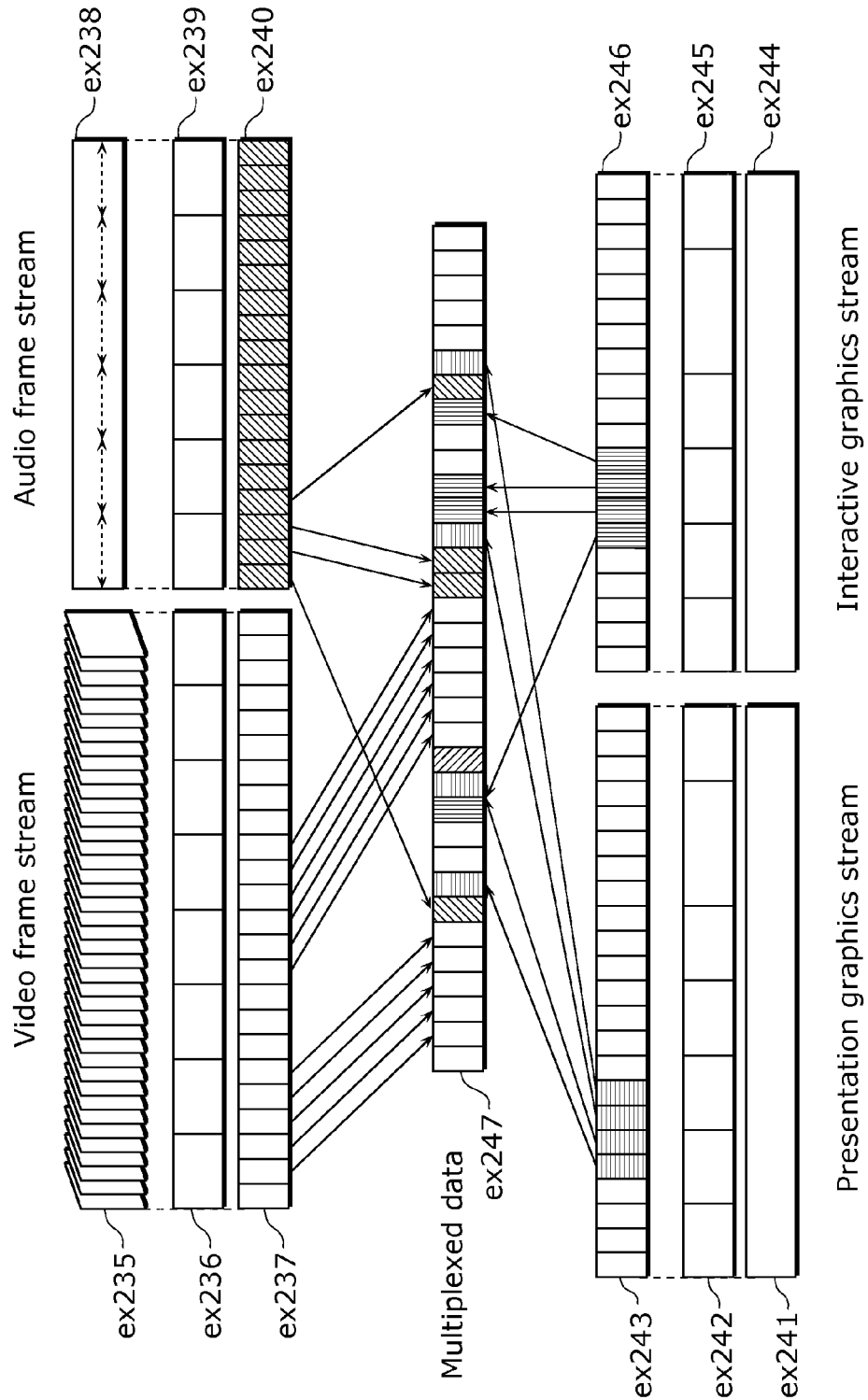
FIG. 35 schematically shows how each stream is multiplexed in multiplexed data.

FIG. 35 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 36:
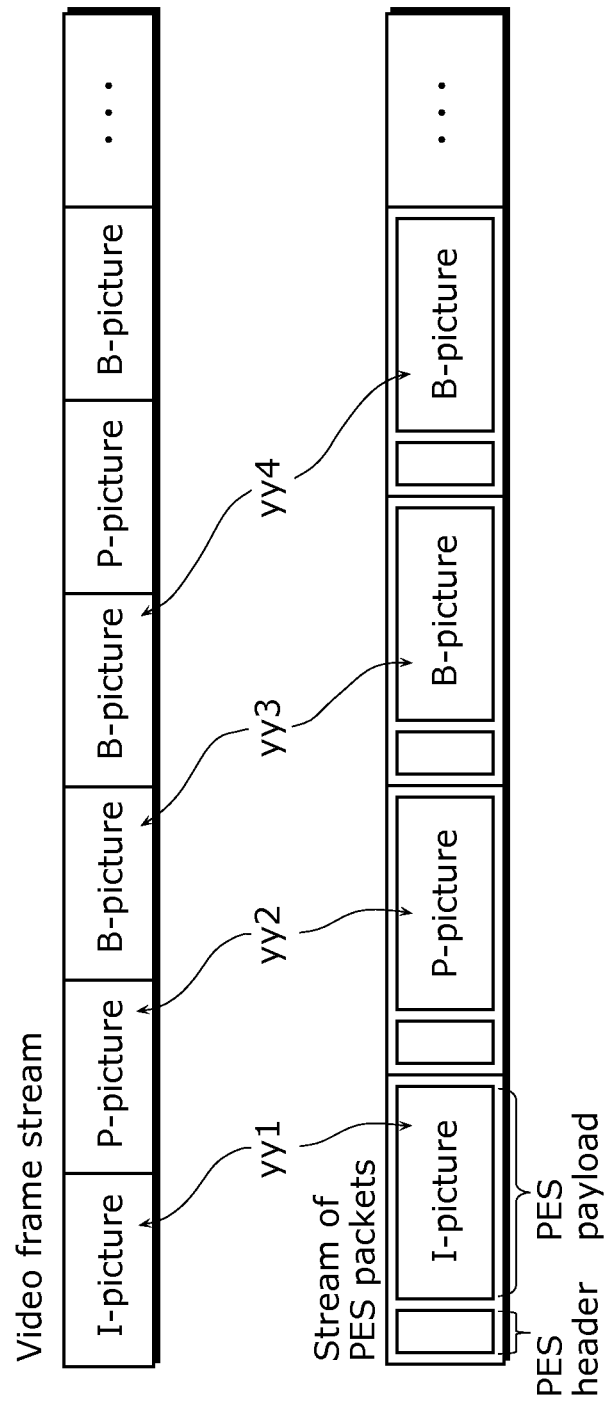
FIG. 36 shows how a video stream is stored in a stream of PES packets in more detail.

FIG. 36 illustrates how a video stream is stored in a stream of PES packets in more detail. The first bar in FIG. 36 shows a video frame stream in a video stream. The second bar shows the stream of PES packets. As indicated by arrows denoted as yy1, yy2, yy3, and yy4 in FIG. 36, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 37 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 37. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 38:
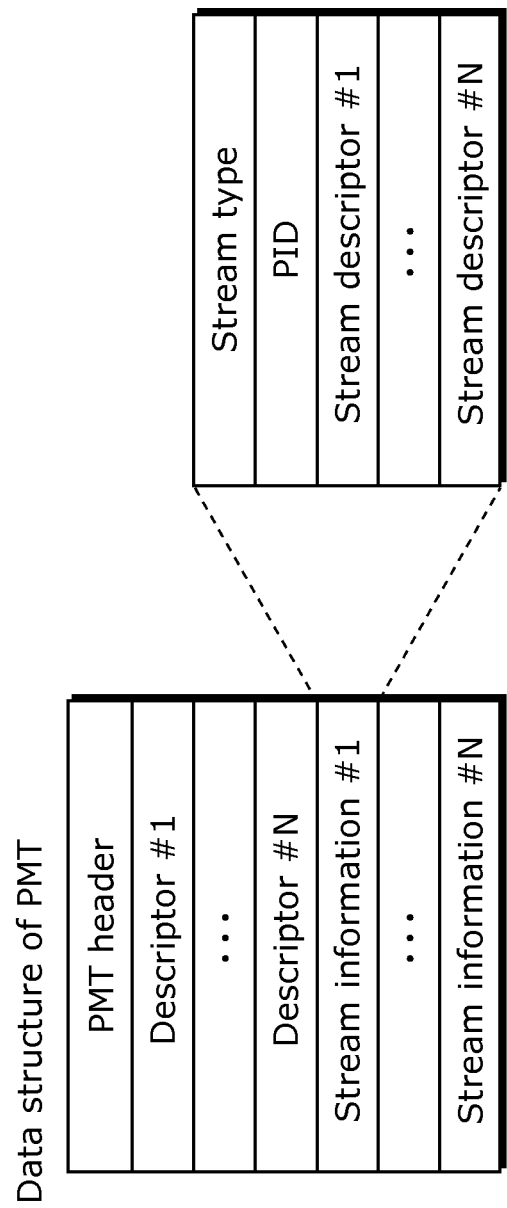
FIG. 38 shows a data structure of a PMT.

FIG. 38 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 39:
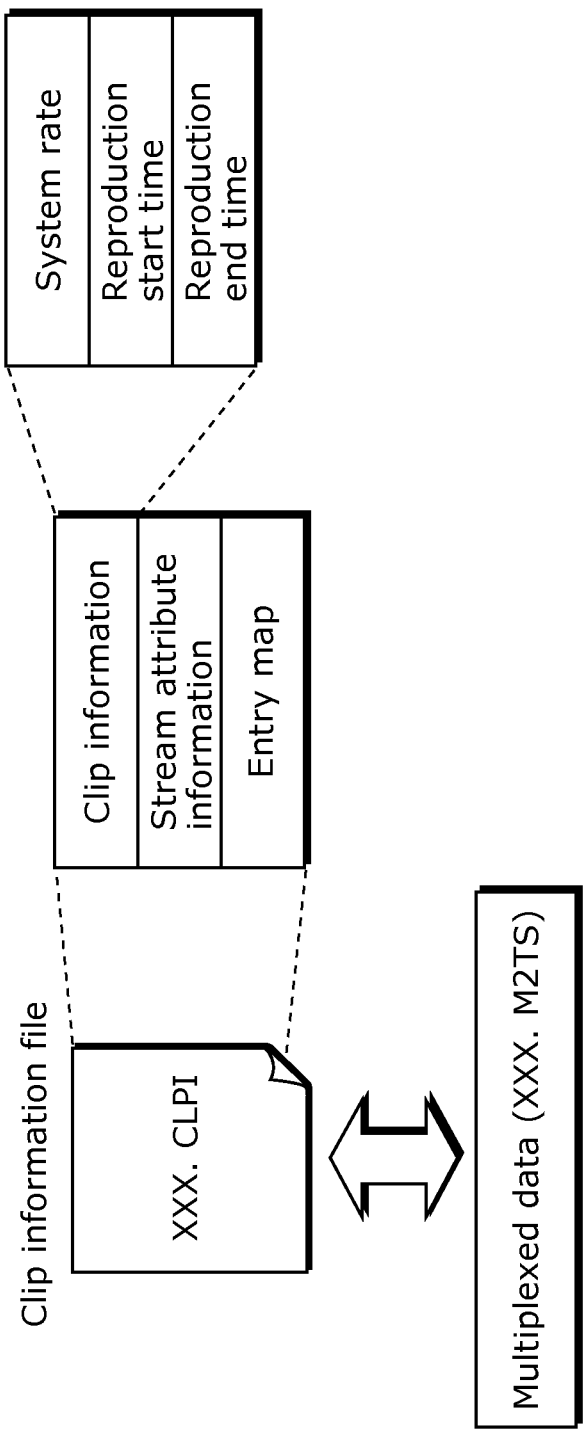
FIG. 39 shows an internal structure of multiplexed data information.

Each of the multiplexed data information files is management information of the multiplexed data as shown in FIG. 39. The multiplexed data information files are in one to one correspondence with the multiplexed data, and each of the files includes multiplexed data information, stream attribute information, and an entry map.

As illustrated in FIG. 39, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 40:
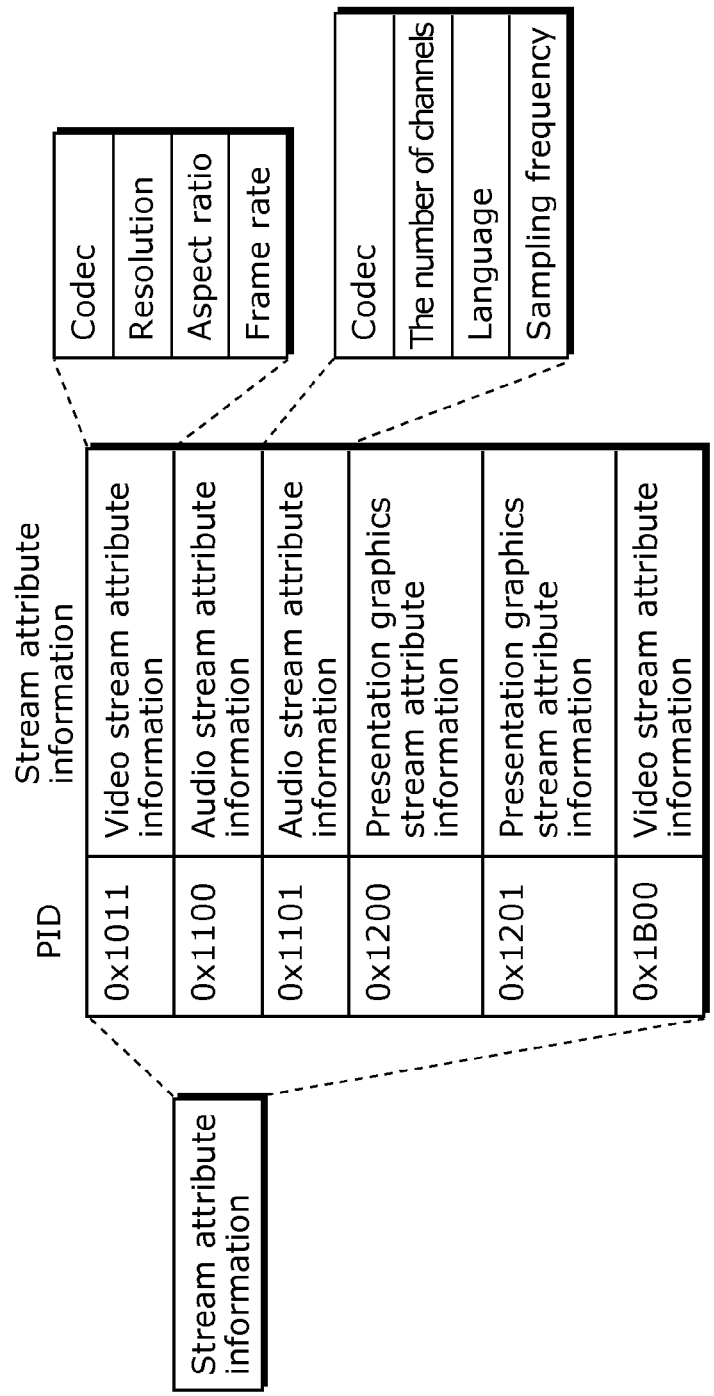
FIG. 40 shows an internal structure of stream attribute information.

As shown in FIG. 40, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 41:
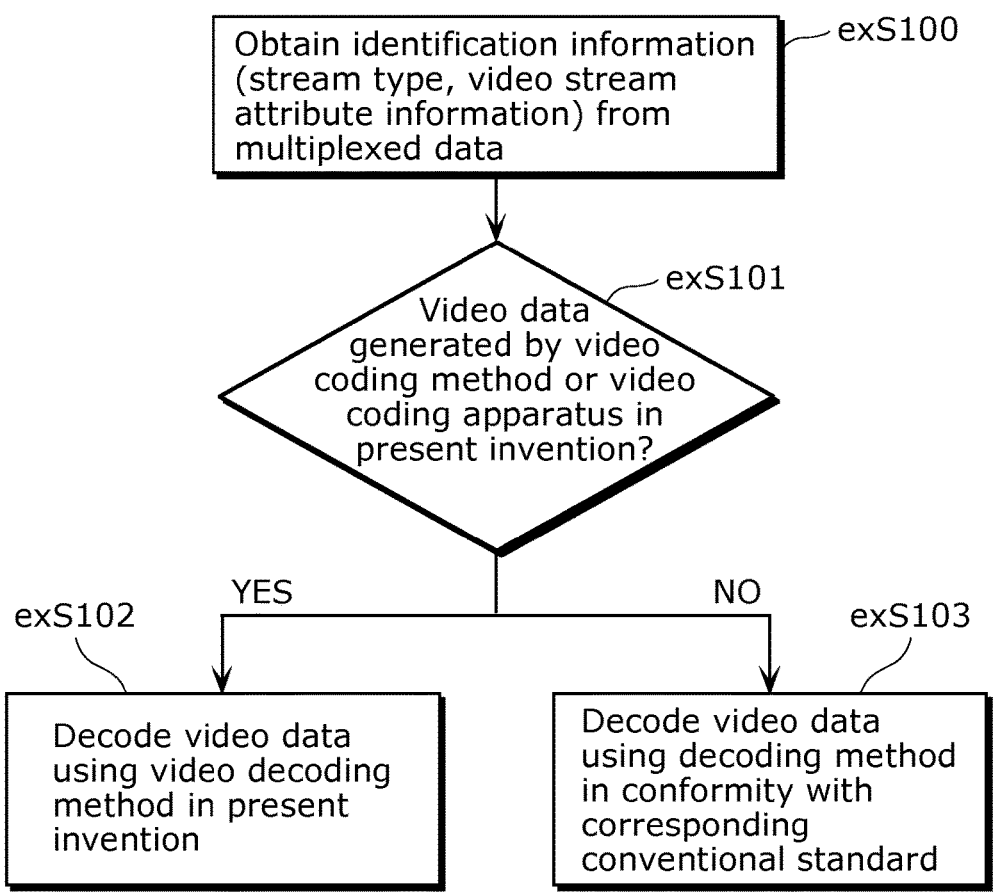
FIG. 41 shows steps for identifying video data.

Furthermore, FIG. 41 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by selecting a reference picture or a motion vector from candidates according to the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards. For example, when the attribute information shows that the stream conforms to the MPEG-4 AVC standard, the stream is decoded on a block-by-block basis using a motion vector not selected from the candidates but calculated from a motion vector of at least one block that is spatially or temporally adjacent to a current block.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 42:
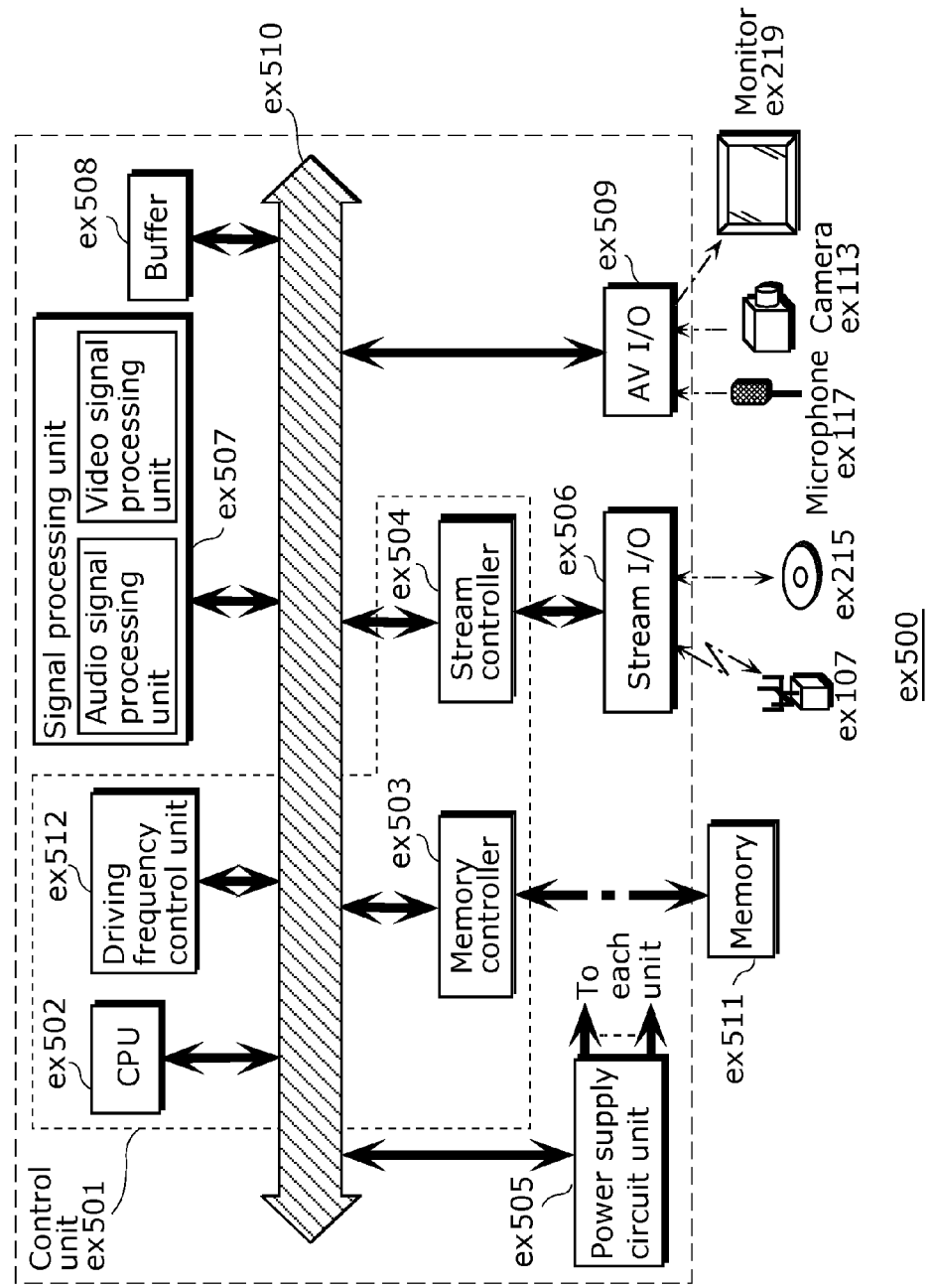
FIG. 42 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 42 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream JO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 43:
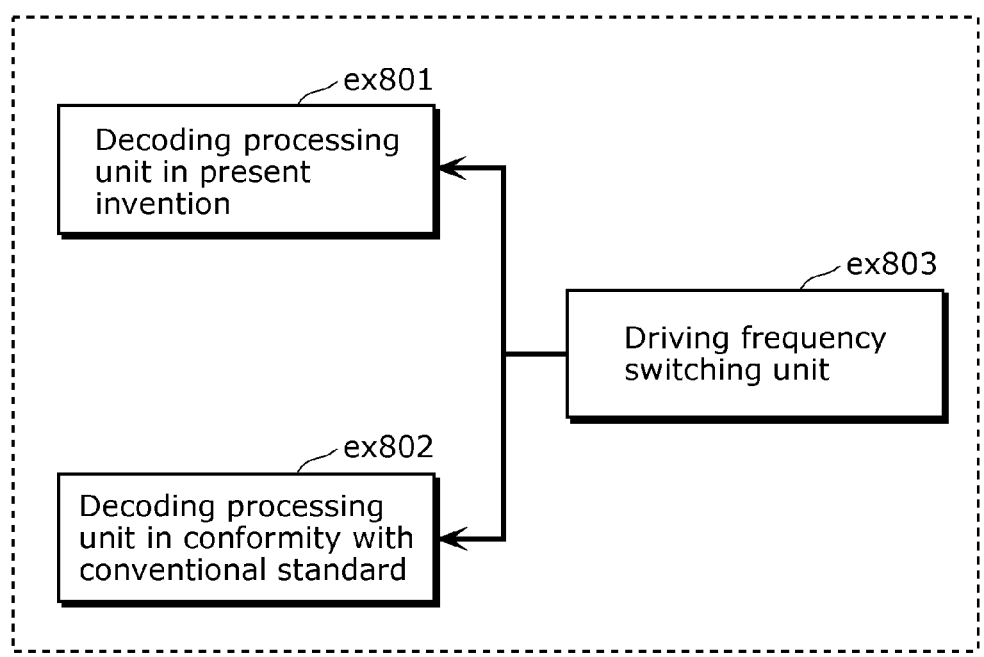
FIG. 43 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 43 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 42. Here, each of the decoding processing unit ex801 that executes the moving picture decoding method described in each of embodiments and the decoding processing unit ex802 that conforms to the conventional standard corresponds to the signal processing unit ex507 in FIG. 42. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 45. The driving frequency can be selected by storing the look-up table in the buffer ex508 and in an internal memory of an LSI, and with reference to the look-up table by the CPU ex502.

Figure 44:
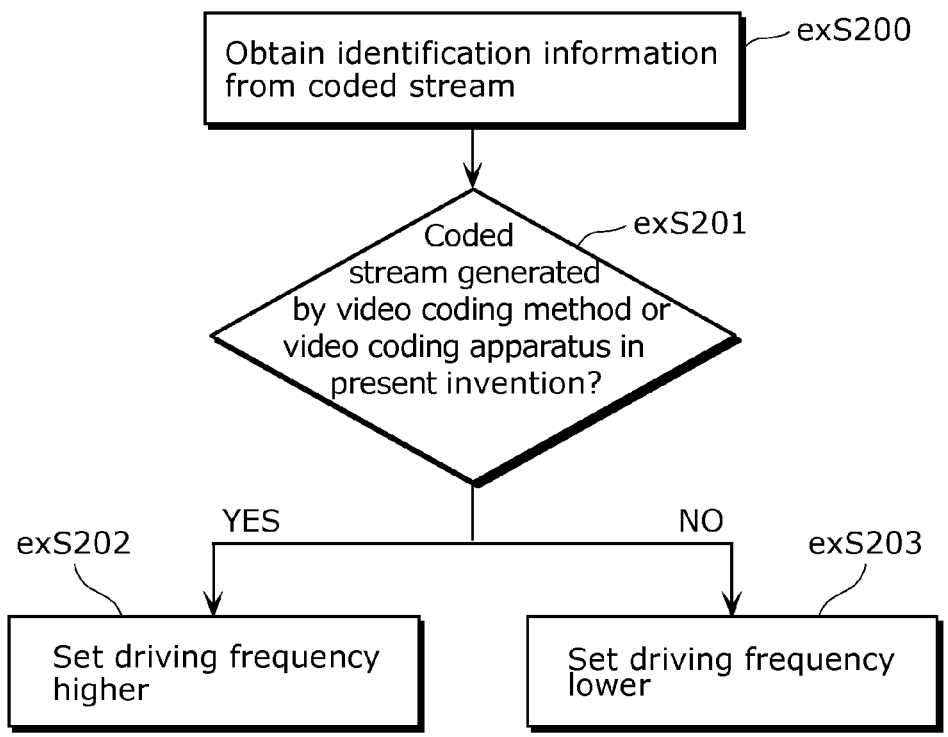
FIG. 44 shows steps for identifying video data and switching between driving frequencies.

FIG. 44 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 46A:
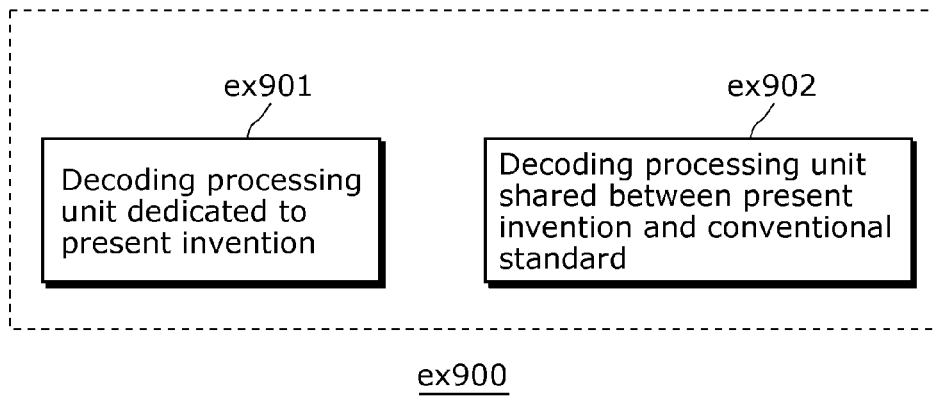
FIG. 46A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 46A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 46B:
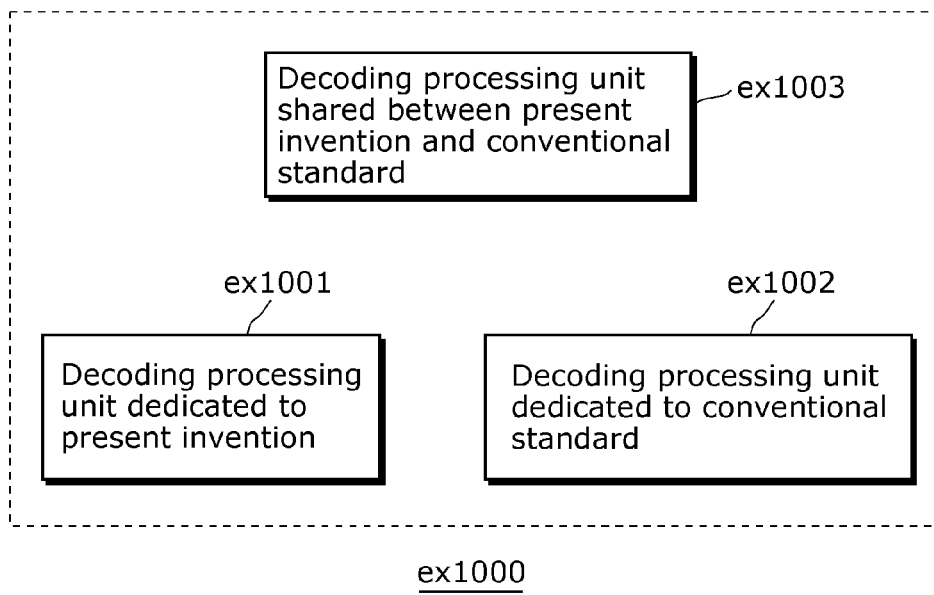
FIG. 46B is a diagram showing another example of a configuration for sharing a module of the signal processing unit.

Furthermore, ex1000 in FIG. 46B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

Each of the constituent elements in each of the above-described embodiments may be configured in the form of an exclusive hardware product, or may be implemented by executing a software program suitable for the structural element. The constituent elements may be implemented by a program execution unit such as a CPU or a processor which reads and executes a software program recorded on a recording medium such as a hard disk or a semiconductor memory. Examples of the software program which implements the image coding apparatus or the image decoding apparatus in the embodiments include a program as follows.

The program causes a computer to execute an image coding method of coding an image. The method includes: obtaining a pixel signal of a current region to be processed; calculating offset information of the current region; applying offset to the current region using the offset information; outputting the offset information; outputting an offset signal resulting from the applying of offset; and controlling the applying of offset.

Furthermore, the program causes a computer to execute an image decoding method of decoding an image. The method includes: obtaining a pixel signal of a current region to be processed; obtaining offset information; applying offset to the current region using the offset information; outputting an offset signal resulting from the applying of offset; and controlling the applying of offset.

Although the image coding apparatus and image decoding apparatus according to one or more aspects of the present invention have been described using exemplary embodiments, the present invention is not limited to these exemplary embodiments. Those skilled in the art will readily appreciate that many modifications of the exemplary embodiments or embodiments in which the constituent elements of the exemplary embodiments are combined are possible without materially departing from the novel teachings and advantages described in the present invention. All such modifications and embodiments are also within scopes of the one or more aspects.

The present invention produces an effect of preventing image quality degradation and sufficiently increasing coding efficiency, and is available for various applications such as storage, transmission, and communication, for example. The present invention is of high use because it can be used, for example, for information display devices and imaging devices with high resolution which include televisions, digital video recorders, car navigation systems, cellular phones, digital cameras, and digital video cameras.

The invention claimed is:

1. An image coding method of coding an image, the method comprising:
    coding a plurality of current regions to be processed into a pixel signal, the plurality of current regions being included in the image;
    calculating offset information of the plurality of current regions, the offset information including a pattern of partitioning the image into the plurality of current regions;
    setting, for each of the plurality of current regions partitioned according to the pattern included in the offset information calculated, each block in a current region to a same offset, and adding, for each of the plurality of current regions, a same offset used in a current region, to each pixel of the pixel signal;
    outputting the offset information;
    outputting an offset signal resulting from the addition of offset; and
    adjusting the addition of offset based on the offset information of the plurality of current regions being different from offset information of a neighboring region.

2. The image coding method according to claim 1,
    wherein the offset information includes at least one of (i) a pixel classification method for classifying pixels in the plurality of current regions into categories, and (ii) an offset value assigned to each of the categories.

3. The image coding method according to claim 2,
    wherein in the pixel classification method, at least one of a relationship between a current pixel to be classified and a pixel neighboring the current pixel and a value of the current pixel is used.

4. The image coding method according to claim 1,
    wherein in the adjusting, the offset to be added to a current pixel in a neighborhood of a boundary with a region neighboring the plurality of current regions is decreased when pixel classification methods are different between the plurality of current regions and the neighboring region.

5. The image coding method according to claim 1,
    wherein the offset information includes at least one of a total number of lines for which the offset is decreased and weighting factors.

6. The image coding method according to claim 5,
    wherein the weighting factors are such that an offset value is further decreased for a pixel at a shorter distance from the boundary with the neighboring region.

7. The image coding method according to claim 6,
    wherein the weighting factors are such that an offset value having a larger absolute value is further decreased.

8. An image decoding method of decoding an image, the method comprising:
    decoding a pixel signal of a plurality of current regions to be processed, the plurality of current regions being included in the image;
    obtaining offset information including information indicating a location of an offset parameter to be referred to, and an offset parameter including a pattern of partitioning the image into the plurality of current regions;
    setting, for each of the plurality of current regions partitioned according to the pattern included in the offset information obtained, each block in a current region to a same offset, and adding, for each of the plurality of current regions, a same offset used in a current region, to each pixel of the pixel signal;

outputting an offset signal resulting from the addition of offset; and adjusting the addition of offset based on the offset information of the plurality of current regions being different from offset information of a neighboring region.

9. The image decoding method according to claim 8, wherein the information indicating a location of the offset parameter to be referred to includes information indicating a location where an offset parameter extracted from a coded stream is stored or a location where an offset parameter for a region neighboring the plurality of current regions is stored.

10. The image decoding method according to claim 9, wherein the region neighboring the plurality of current regions is located left of or above the plurality of current regions.

11. The image decoding method according to claim 8, wherein the offset parameter includes at least one of (i) a pattern of partitioning of the plurality of current regions, (ii) a pixel classification method for classifying pixels into categories, and (iii) an offset value assigned to each of the categories.

12. The image decoding method according to claim 8, wherein in the adjusting, the adding of offset is controlled so that it is determined in the adding of offset whether pixel classification methods are different between the plurality of current regions and the region neighboring the plurality of current regions.

13. The image decoding method according to claim 12, wherein in the adjusting, the offset to be applied to a pixel in a neighborhood of a boundary with a neighboring region is decreased when it is determined that pixel classification methods are different between the plurality of current regions and the neighboring region.

14. The image decoding method according to claim 8, wherein in the determining, the location of an offset parameter to be referred to is used.

15. The image decoding method according to claim 8, wherein the offset information includes at least one of a total number of lines for which the offset is decreased and weighting factors.

16. The image decoding method according to claim 15, wherein the weighting factors are such that an offset value is further decreased for a pixel at a shorter distance from the boundary with the neighboring region.

17. The image decoding method according to claim 16, wherein the weighting factors are such that an offset value having a larger absolute value is further decreased.

18. A non-transitory computer-readable recording medium on which a program that causes a computer to execute the image coding method according to claim 1 is recorded.

19. A non-transitory computer-readable recording medium on which a program that causes a computer to execute the image decoding method according to claim 8 is recorded.

\* \* \* \* \*